US011690120B2

(12) United States Patent
Yang et al.

(10) Patent No.: US 11,690,120 B2
(45) Date of Patent: Jun. 27, 2023

(54) METHOD AND APPARATUS FOR A SUB-BAND TRANSPOSE REPEATER

(71) Applicant: Nokia Solutions and Networks Oy, Espoo (FI)

(72) Inventors: Roy Yang, Buffalo Grove, IL (US); Axel Mueller, Paris (FR); Phillip Rasky, Buffalo Grove, IL (US); Wolfgang Templ, Sersheim (DE)

(73) Assignee: Nokia Solutions and Networks Oy, Espoo (FI)

( * ) Notice: Subject to any disclaimer, the term of this patent is extended or adjusted under 35 U.S.C. 154(b) by 183 days.

(21) Appl. No.: 17/370,086

(22) Filed: Jul. 8, 2021

(65) Prior Publication Data

US 2023/0008206 A1  Jan. 12, 2023

(51) Int. Cl.
*H04W 76/15* (2018.01)
*H04W 88/04* (2009.01)
(Continued)

(52) U.S. Cl.
CPC .............. *H04W 76/15* (2018.02); *H04L 27/10* (2013.01); *H04W 72/0453* (2013.01); *H04W 88/04* (2013.01)

(58) Field of Classification Search
None
See application file for complete search history.

(56) References Cited

U.S. PATENT DOCUMENTS

2020/0382200 A1\* 12/2020 Hormis ............... H04B 7/15542
2021/0037457 A1\* 2/2021 Li ..................... H04W 52/0203
(Continued)

FOREIGN PATENT DOCUMENTS

WO    WO-2020146631 A1 * 7/2020 ............. H04L 5/001

OTHER PUBLICATIONS

3GPP TS 38.101-2 V17.1.0, Mar. 2021, pp. 19-21.
(Continued)

*Primary Examiner* — Saumit Shah
(74) *Attorney, Agent, or Firm* — Harrington & Smith

(57) ABSTRACT

In accordance with example embodiments of the invention there is at least an apparatus and a method to perform determining, by a network node, a repeater, and/or a user equipment of a communication network, a configuration message comprising an identified frequency range of at least one of a first communication link between a donor and a repeater or a second communication link between a user equipment and the repeater for a repeat transmission in the communication network; and communicating with at least one of the repeater or the user equipment an indication of the configuration message for configuration at the repeater and the user equipment of the at least one set of sub-carriers mapped with the at least one physical channel for the repeat transmission, wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and mapping comprises performing spectral modification of resources to cause at least one of: sub-carrier shifting, wherein a sub-carrier is selected for the repeater to frequency shift to another part of the spectrum, based on instructions by the network node, sub-carrier inversion, wherein sub-carriers' indices are inversed, based on an on/off decision by the network node, and wherein the spectral modification is causing the at least one set of sub-carriers with the at least one physical channel to have different spectral properties as compared to a target set of (Continued)

sub-carriers associated with at least one of the user equipment or the repeater.

50 Claims, 20 Drawing Sheets

(51) Int. Cl.
  *H04W 72/0453* (2023.01)
  *H04L 27/10* (2006.01)

(56) References Cited

U.S. PATENT DOCUMENTS

2022/0046618 A1* 2/2022 Abedini ................. H04B 7/155
2022/0053486 A1* 2/2022 Abedini ................ H04L 5/0053
2022/0416967 A1* 12/2022 Bao .................... H04B 7/15507

OTHER PUBLICATIONS

3GPP TS 38.104 V17.2.0, Section 6.3.3, Jun. 2021, 2 pages.
3GPP TS 38.104 V17.2.0, Jun. 2021, pp. 50-52.
3GPP TS 38.106 V0.0.1, "3rd Generation Partnership Project; Technical Specification Group Radio Access Network; NR; NR Repeater Radio Transmission and Reception (Release 17)", Apr. 2021, 13 pages.
"New WID on NR Repeaters", Qualcomm, 3GPP TSG RAN Meeting #91e, RP 210818, Mar. 16-26, 2021, 4 pages.
"Channel Selective-Frequency Shifting Repeater", RF-1822, Jan. 15, 2008, 3 pages.

* cited by examiner

| SUBCARRIER NUMBER | gNB OUTPUT | REPEATER OUTPUT |
|---|---|---|
| 1 | a | e |
| 2 | b | d |
| 3 | c | c |
| 4 | d | b |
| 5 | e | a |

REPEATER-SUBBAND-REPETITION-CONFIGURATION-MESSAGE

Donor gNB ID
Repeater ID
BWP ID
Number of Subband Repetition commands
Subband Repetition command 1
    Direction =
        Enumerated { Downlink (input-fronthaul link, output-access link), Uplink (Input-access link, output-fronthaul link) }
    Activation Time =
        Symbol Index in the radio frame
    Activation Duration =
        Number of symbols
    Incoming subband info
        Bandwidth =
            Number of PRBs
        Frequency offset =
            Subcarrier index
    Outgoing subband info
        Frequency shift factor =
            Signed number of subcarriers
        Spectral inversion
            Enumerated { Enable, Disable }
Subband Repetition command 2
...

FIG.19A

UE-SUBBAND-REPETITION-CONFIGURATION-MESSAGE

Donor gNB ID
Repeater ID
Number of Subband Repetition commands
Subband Repetition command 1
　　Direction =
　　　　Downlink
　　　　Uplink
　　Activation Time =
　　Activation Duration =
　　Number of symbols
　　Access link subband info
　　　　Bandwidth =
　　　　　　Number of PRBs
　　　　Frequency offset =
　　　　　　Subcarrier index
　　Target subband info
　　　　Frequency shift factor =
　　　　　　Signed number of subcarriers
Subband Repetition command 2
...

FIG.19B

```
┌─────────────────────────────────────────────────────────────┐
│   DETERMINING, BY A NETWORK NODE OF A COMMUNICATION         │
│     NETWORK, A CONFIGURATION MESSAGE COMPRISING AN          │
│  IDENTIFIED FREQUENCY RANGE OF AT LEAST ONE OF A FIRST      │─2010
│  COMMUNICATION LINK BETWEEN A DONOR AND A REPEATER OR       │
│   A SECOND COMMUNICATION LINK BETWEEN A USER EQUIPMENT      │
│     AND THE REPEATER FOR A REPEAT TRANSMISSION IN THE       │
│                   COMMUNICATION NETWORK                     │
└─────────────────────────────────────────────────────────────┘
                              ↓
┌─────────────────────────────────────────────────────────────┐
│  WHEREIN THE CONFIGURATION MESSAGE IS USING AT LEAST A      │
│  DIFFERENT FREQUENCY OFFSET OF SUPPORTED RADIO FREQUENCY    │
│  RESOURCES TO MAP AT LEAST ONE SET OF SUB-CARRIERS OF       │─2020
│  THE AT LEAST ONE OF THE FIRST COMMUNICATION LINK AND THE   │
│   SECOND COMMUNICATION LINK WITH AT LEAST ONE PHYSICAL      │
│   CHANNEL IN SUPPORTED RADIO FREQUENCY RESOURCES OF AT      │
│   LEAST ONE OF THE FIRST COMMUNICATION LINK OR THE SECOND   │
│                    COMMUNICATION LINK                       │
└─────────────────────────────────────────────────────────────┘
                              ↓
┌─────────────────────────────────────────────────────────────┐
│      WHEREIN MAPPING COMPRISES PERFORMING SPECTRAL          │
│    MODIFICATION OF RESOURCES TO CAUSE AT LEAST ONE OF:      │
│  SUB-CARRIER SHIFTING, WHEREIN A SUB-CARRIER IS SELECTED    │
│  FOR THE REPEATER TO FREQUENCY SHIFT TO ANOTHER PART OF     │─2030
│  THE SPECTRUM, BASED ON INSTRUCTIONS BY THE NETWORK NODE,   │
│  SUB-CARRIER INVERSION, WHEREIN SUB-CARRIERS' INDICES ARE   │
│    INVERSED, BASED ON AN ON/OFF DECISION BY THE NETWORK     │
│                             NODE                            │
└─────────────────────────────────────────────────────────────┘
                              ↓
┌─────────────────────────────────────────────────────────────┐
│  WHEREIN THE SPECTRAL MODIFICATION IS CAUSING THE AT LEAST  │
│  ONE SET OF SUB-CARRIERS WITH THE AT LEAST ONE PHYSICAL     │─2040
│     CHANNEL TO HAVE DIFFERENT SPECTRAL PROPERTIES AS        │
│  COMPARED TO A TARGET SET OF SUB-CARRIERS ASSOCIATED        │
│  WITH AT LEAST ONE OF THE USER EQUIPMENT OR THE REPEATER    │
└─────────────────────────────────────────────────────────────┘
                              ↓
┌─────────────────────────────────────────────────────────────┐
│   SENDING TOWARDS AT LEAST ONE OF THE REPEATER OR THE       │
│    USER EQUIPMENT AN INDICATION OF THE CONFIGURATION        │
│  MESSAGE FOR CONFIGURATION AT THE REPEATER AND THE USER     │─2050
│   EQUIPMENT OF THE AT LEAST ONE SET OF SUB-CARRIERS         │
│    MAPPED WITH THE AT LEAST ONE PHYSICAL CHANNEL            │
│             FOR THE REPEAT TRANSMISSION                     │
└─────────────────────────────────────────────────────────────┘
```

FIG.20

```
┌─────────────────────────────────────────────────────────┐
│ DETERMINING, BY A REPEATER OF A COMMUNICATION NETWORK,  │
│ A CONFIGURATION MESSAGE FROM A NETWORK NODE IDENTIFYING │
│   A FREQUENCY RANGE OF AT LEAST ONE OF A FIRST          │──2110
│ COMMUNICATION LINK BETWEEN A DONOR AND THE REPEATER OR  │
│ A SECOND COMMUNICATION LINK BETWEEN A USER EQUIPMENT    │
│   AND THE REPEATER FOR A REPEAT TRANSMISSION IN THE     │
│                  COMMUNICATION NETWORK                  │
└─────────────────────────────────────────────────────────┘
                            ↓
┌─────────────────────────────────────────────────────────┐
│   WHEREIN THE CONFIGURATION MESSAGE IS USING AT LEAST A │
│ DIFFERENT FREQUENCY OFFSET OF SUPPORTED RADIO FREQUENCY │
│ RESOURCES TO MAP AT LEAST ONE SET OF SUB-CARRIERS OF    │──2120
│ THE AT LEAST ONE OF THE FIRST COMMUNICATION LINK AND THE│
│  SECOND COMMUNICATION LINK WITH AT LEAST ONE PHYSICAL   │
│ CHANNEL IN SUPPORTED RADIO FREQUENCY RESOURCES OF AT    │
│ LEAST ONE OF THE FIRST COMMUNICATION LINK OR THE SECOND │
│                   COMMUNICATION LINK                    │
└─────────────────────────────────────────────────────────┘
                            ↓
┌─────────────────────────────────────────────────────────┐
│     WHEREIN MAPPING COMPRISES PERFORMING SPECTRAL       │
│   MODIFICATION OF RESOURCES TO CAUSE AT LEAST ONE OF:   │
│  SUB-CARRIER SHIFTING, WHEREIN A SUB-CARRIER IS SELECTED│──2130
│  FOR THE REPEATER TO FREQUENCY SHIFT TO ANOTHER PART OF │
│ THE SPECTRUM, BASED ON INSTRUCTIONS BY THE NETWORK NODE,│
│ SUB-CARRIER INVERSION, WHEREIN SUB-CARRIERS' INDICES ARE│
│   INVERSED, BASED ON AN ON/OFF DECISION BY THE NETWORK  │
│                           NODE                          │
└─────────────────────────────────────────────────────────┘
                            ↓
┌─────────────────────────────────────────────────────────┐
│  WHEREIN THE SPECTRAL MODIFICATION IS CAUSING THE AT LEAST│
│ ONE SET OF SUB-CARRIERS WITH THE AT LEAST ONE PHYSICAL  │──2140
│  CHANNEL TO HAVE DIFFERENT SPECTRAL PROPERTIES AS       │
│  COMPARED TO A TARGET SET OF SUB-CARRIERS ASSOCIATED    │
│ WITH AT LEAST ONE OF THE USER EQUIPMENT OR THE REPEATER │
└─────────────────────────────────────────────────────────┘
                            ↓
┌─────────────────────────────────────────────────────────┐
│   USE BY THE REPEATER THE CONFIGURATION MESSAGE FOR     │
│ CONFIGURATION AT THE REPEATER OF THE AT LEAST ONE SET   │──2150
│ OF SUB-CARRIERS MAPPED WITH THE AT LEAST ONE PHYSICAL   │
│         CHANNEL FOR THE REPEAT TRANSMISSION             │
└─────────────────────────────────────────────────────────┘
```

FIG.21

METHOD AND APPARATUS FOR A SUB-BAND TRANSPOSE REPEATER

TECHNICAL FIELD

The teachings in accordance with the exemplary embodiments of this invention relate generally to sub-band signal repetition through a Repeater Device and, more specifically, relate to repeater operations by a Repeater Device which include frequency shifted sub-bands.

BACKGROUND

This section is intended to provide a background or context to the example embodiments of the invention that is recited in the claims. The description herein may include concepts that could be pursued, but are not necessarily ones that have been previously conceived or pursued, Therefore, unless otherwise indicated herein, what is described in this section is not prior art to the description and claims in this application and is not admitted to be prior art by inclusion in this section.

Cellular repeaters are widely used in the 2G/3G/4G wireless networks to provide coverage extension. A repeater receives the signal from the nearby base station, amplifies and retransmits it to the nearby user equipment in the downlink direction, and in the uplink direction, the repeater receives signals from the UE equipment, amplifies and retransmits to the base station. A Repeater can be used in 5GNR as well for coverage improvement.

Example embodiments of the invention as disclosed herein work to improve such repeater operations.

Certain abbreviations that may be found in the description and/or in the Figures are herewith defined as follows:
BS Base Station
CC Component Carrier
CBW Channel Bandwidth
CSI-RS Channel State Information Reference Signal
DMRS Demodulation Reference Signal
FDD Frequency Division Duplex
FFT Fast Fourier Transform
FR1 Frequency Range 1
GSCN Global Synchronization Channel Number
gNB NR capable Base Station
GPRS General Packet Radio Service
IFFT Inverse fast Fourier transform
MU Master Unit
NR New Radio
PDCCH Physical Downlink Control Channel
PDSCH Physical Downlink Shared Channel
PR Receive Power
PRB Physical Resource Block
PT Transmit Power
RRC Radio Resource Control
RU Remote Unit
SCS Subcarrier Spacing
SSB Synchronization Signal Block
UE User Equipment

SUMMARY

This section contains examples of possible implementations and is not meant to be limiting.

In an example aspect of the invention, there is an apparatus, such as a network side apparatus, comprising: at least one processor; and at least one memory including computer program code, where the at least one memory and the computer program code are configured, with the at least one processor, to cause the apparatus to at least: determine, by a network node of a communication network, a configuration message comprising an identified frequency range of at least one of a first communication link between a donor and a repeater or a second communication link between a user equipment and the repeater for a repeat transmission in the communication network, wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and wherein mapping comprises performing spectral modification of resources to cause at least one of: sub-carrier shifting, wherein a sub-carrier is selected for the repeater to frequency shift to another part of the spectrum, based on instructions by the network node, sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one ofthe user equipment or the repeater; and send towards at least one of the repeater or the user equipment an indication of the configuration message for configuration at the repeater and the user equipment of the at least one set of sub-carriers mapped with the at least one physical channel for the repeat transmission.

In another example aspect of the invention, there is a method comprising: determining, by a network node of a communication network, a configuration message comprising an identified frequency range of at least one of a first communication link between a donor and a repeater or a second communication link between a user equipment and the repeater for a repeat transmission in the communication network, wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and wherein mapping comprises performing spectral modification of resources to cause at least one of: sub-carrier shifting, wherein a sub-carrier is selected for the repeater to frequency shift to another part of the spectrum, based on instructions by the network node, sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one of the user equipment or the repeater; and sending towards at least one of the repeater or the user equipment an indication of the configuration message for configuration at the repeater and the user equipment of the at least one set of sub-carriers mapped with the at least one physical channel for the repeat transmission.

A further example embodiment is an apparatus and a method comprising the apparatus and the method of the previous paragraph, wherein the first communication link comprises a fronthaul link, and the second communication link comprises an access link, wherein a minimal frequency offset comprises one-subcarrier spacing, wherein information concerning scheduling of physical channels of the user equipment is transmitted in one or more sets; wherein scheduling information based on the spectral modification is placed in ignored time frequency resources for the user equipment being served by the network node; and wherein scheduling information for before the spectral modification of resources that is to be ignored is placed in time frequency resources for the user equipment being served by a repeater, wherein the different frequency offset for a mirror image of signaling based on the at least one of sub-carrier mapping or shifting or sub-carrier mapping or inversion is identified based on a preferred frequency range based on quality of the at least one physical channel in the supported radio frequency resources of the at least one of the first communication link or the second communication link, wherein a mirror image of signaling of the at least one set of sub-carriers of the at least one of the first communication link or the second communication link in the different frequency offset is using at least one sub-carrier that is one of partially or fully overlapping the target sub-carrier associated with at least one of the user equipment or the repeater, wherein the at least one physical channel comprises at least one of a downlink physical channel or an uplink physical channel, wherein the at least one set of sub-carriers comprises useful data for the repeat transmission that is from at least a portion of a full channel bandwidth from which the useful data is taken, wherein the configuration message comprises at least one of a receive bandpass filter or a configurable transmit bandpass filter with a passband bandwidth and frequency offset that matches a signal bandwidth and a targeted frequency offset, wherein at least one of the configurable transmit bandpass filter or configurable receive bandpass filter, are configured to ensure that only useful data in the target sub-carrier can go through the repeater, and anything outside of the useful data will be suppressed, wherein shifting the at least one set of sub-carriers with the at least one physical channel to a different frequency offset is based on a maximum allowed separation between the at least one set of sub-carriers of the first communication link and the second communication link, wherein shifting the at least one set of sub-carriers with the at least one physical channel to a different frequency offset is based on user traffic associated with the user equipment, wherein based on the different frequency offset the indication of the configuration message is sent toward at least one of the user equipment or the repeater, wherein determining the configuration message is based on at least one of: a traffic payload to be transmitted between the network node and the user equipment at a specific time beginning at one of a particular slot or symbol, a maximum allowed separation between the at least one set of sub-carriers of the first communication link and the second communication link, a number of physical resource blocks of a subband bandwidth required for the at least one physical channel based on a traffic payload to be transmitted between the network node and the user equipment, or a starting frequency offset of a set of sub-carriers in a preferred frequency ranges of the at least one of the fronthaul link or the access link, wherein the indication of the configuration message sent towards at least one of the repeater or the user equipment is using a set of sub-carriers repetition configuration message, and/or wherein the set of sub-carriers repetition configuration message is sent based on the at least one sub-band being different between the fronthaul link and the access link.

In another example aspect of the invention, there is an apparatus comprising: means for determining, by a network node of a communication network, a configuration message comprising an identified frequency range of at least one of a first communication link between a donor and a repeater or a second communication link between a user equipment and the repeater for a repeat transmission in the communication network, wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and wherein mapping comprises means for performing spectral modification of resources to cause at least one of: sub-carrier shifting, wherein a sub-carrier is selected for the repeater to frequency shift to another part of the spectrum, based on instructions by the network node; sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one of the user equipment or the repeater; and means for sending towards at least one of the repeater or the user equipment an indication of the configuration message for configuration at the repeater and the user equipment of the at least one set of sub-carriers mapped with the at least one physical channel for the repeat transmission.

In accordance with the example embodiments as described in the paragraph above, at least the means for determining, performing, and sending comprises a network interface, and computer program code stored on a computer-readable medium and executed by at least one processor.

In another example aspect of the invention, there is an apparatus, such as a repeater side apparatus, comprising: at least one processor; and at least one memory including computer program code, where the at least one memory and the computer program code are configured, with the at least one processor, to cause the apparatus to at least: determine, by a repeater of a communication network, an indication of a configuration message from a network node identifying a frequency range of at least one of a first communication link between a donor and the repeater or a second communication link between a user equipment and the repeater for a repeat transmission in the communication network, wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and wherein mapping comprises performing spectral modification of resources to cause at least one of: sub-carrier shifting, wherein a sub-carrier is selected for the repeater to frequency shift to another part of the spectrum, based on instructions by the network node, sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one of the user equipment or the repeater; and use by the repeater the indication of the configuration message for configuration at the repeater of the at least one set of sub-carriers mapped with the at least one physical channel for the repeat transmission.

In another example aspect of the invention, there is a method comprising: determining, by a repeater of a communication network, an indication of a configuration message from a network node identifying a frequency range of at least one of a first communication link between a donor and the repeater or a second communication link between a user equipment and the repeater for a repeat transmission in the communication network, wherein the configuration message is using at least a different frequency offset of supported radio frequency resources to map at least one set of subcarriers of the at least one of the first communication link and the second communication link with at least one physical channel in supported radio frequency resources of at least one of the first communication link or the second communication link, and wherein mapping comprises performing spectral modification of resources to cause at least one of: sub-carrier shifting, wherein a sub-carrier is selected for the repeater to frequency shift to another part of the spectrum, based on instructions by the network node; sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one of the user equipment or the repeater; and using by the repeater the indication of the configuration message for configuration at the repeater of the at least one set of sub-carriers mapped with the at least one physical channel for the repeat transmission.

A further example embodiment is an apparatus and a method comprising the apparatus and the method of the previous paragraph, wherein the first communication link comprises a fronthaul link, and the second communication link comprises an access link, wherein a minimal frequency offset comprises one-subcarrier spacing, wherein the different frequency offset for a mirror image of signaling based on the at least one of sub-carrier mapping or shifting or sub-carrier mapping or inversion is identified based on a preferred frequency range based on quality of the at least one physical channel in the supported radio frequency resources of the at least one of the first communication link or the second communication link, wherein a mirror image of signaling of the at least one set of sub-carriers of the at least one of the first communication link or the second communication link in the different frequency offset is using at least one sub-carrier that is one of partially or fully overlapping the target sub-carrier associated with at least one of the user equipment or the repeater, wherein the at least one physical channel comprises at least one of a downlink physical channel or an uplink physical channel, wherein the at least one set of sub-carriers comprises useful data for the repeat transmission that is from at least a portion of a full channel bandwidth from which the useful data is taken, wherein the configuration message comprises at least one of a receive bandpass filter or a configurable transmit bandpass filter with a passband bandwidth and frequency offset that matches a signal bandwidth and a targeted frequency offset, wherein at least one of the configurable transmit bandpass filter or configurable receive bandpass filter, are configured to ensure that only useful data in the target sub-carrier can go through the repeater, and anything outside of the useful data will be suppressed, wherein shifting the at least one set of sub-carriers with the at least one physical channel to a different frequency offset is based on a maximum allowed separation between the at least one set of sub-carriers of the first communication link and the second communication link, wherein shifting the at least one set of sub-carriers with the at least one physical channel to a different frequency offset is based on user traffic associated with the user equipment, wherein based on the different frequency offset the indication of the configuration message is sent toward at least one of the user equipment or the repeater, wherein determining the configuration message is based on at least one of: a traffic payload to be transmitted between the network node and the user equipment at a specific time beginning at one of a particular slot or symbol, a maximum allowed separation between the at least one set of sub-carriers of the first communication link and the second communication link, a number of physical resource blocks of a subband bandwidth required for the at least one physical channel based on a traffic payload to be transmitted between the network node and the user equipment, or a starting frequency offset of a set of sub-carriers in a preferred frequency ranges of the at least one of the fronthaul link or the access link, wherein the indication of the configuration message sent towards at least one of the repeater or the user equipment is using a set of sub-carriers repetition configuration message, and/or wherein the set of sub-carriers repetition configuration message is sent based on the at least one sub-band being different between the fronthaul link and the access link.

In another example aspect of the invention, there is an apparatus comprising: means for determining, by a repeater of a communication network, an indication of a configuration message from a network node identifying a frequency range of at least one of a first communication link between a donor and the repeater or a second communication link between a user equipment and the repeater for a repeat transmission in the communication network, wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and wherein mapping comprises means for performing spectral modification of resources to cause at least one of: sub-carrier shifting, wherein a sub-carrier is selected for the repeater to frequency shift to another part of the spectrum, based on instructions by the network node; sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one of the user equipment or the repeater; and means for using by the repeater the indication of the configuration message for configuration at the repeater of the at least one set of sub-carriers mapped with the at least one physical channel for the repeat transmission.

In accordance with the example embodiments as described in the paragraph above, at least the means for determining, performing, and using comprises a network interface, and computer program code stored on a computer-readable medium and executed by at least one processor.

In another example aspect of the invention, there is an apparatus, such as a user equipment apparatus, comprising at least one processor; and at least one non-transitory memory including computer program code, where the at least one non-transitory memory and the computer program code are configured, with the at least one processor, to cause the apparatus to at least: determine, by a user equipment of a communication network, a configuration message from a network node comprising an identified frequency range of at least one of a first communication link between a donor and a repeater or a second communication link between the user equipment and the repeater for a repeat transmission in the communication network, wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and wherein mapping comprises performing spectral modification of resources to cause at least one of: sub-carrier shifting, wherein a sub-carrier is selected for the repeater to frequency shift to another part of the spectrum, based on instructions by the network node; sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one of the user equipment or the repeater; and use the configuration message for configuration at the user equipment of the at least one set of sub-carriers mapped with the at least one physical channel for the repeat transmission.

In another example aspect of the invention, there is a method comprising: determining, by a user equipment of a communication network, a configuration message from a network node comprising an identified frequency range of at least one of a first communication link between a donor and a repeater or a second communication link between a user equipment and the repeater for a repeat transmission in the communication network, wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and wherein mapping comprises performing spectral modification of resources to cause at least one of: sub-carrier shifting, wherein a sub-carrier is selected for the repeater to frequency shift to another part of the spectrum, based on instructions by the network node; sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one of the user equipment or the repeater; and using the configuration message for configuration at the user equipment of the at least one set of sub-carriers mapped with the at least one physical channel for the repeat transmission.

A further example embodiment is an apparatus and a method comprising the apparatus and the method of the previous paragraph, wherein the first communication link comprises a fronthaul link, and the second communication link comprises an access link, wherein a minimal frequency offset comprises one-subcarrier spacing, wherein information concerning scheduling of physical channels of the user equipment is transmitted in one or more sets; and wherein scheduling information based on the spectral modification is placed in ignored time frequency resources for the user equipment being served by the network node; and wherein scheduling information for before the spectral modification of resources that is to be ignored is placed in time frequency resources for the user equipment being served by a repeater, wherein the different frequency offset for a mirror image of signaling based on the at least one of sub-carrier mapping or shifting or sub-carrier mapping or inversion is identified based on a preferred frequency range based on quality of the at least one physical channel in the supported radio frequency resources of the at least one of the first communication link or the second communication link, wherein a mirror image of signaling of the at least one set of sub-carriers of the at least one of the first communication link or the second communication link in the different frequency offset is using at least one sub-carrier that is one of partially or fully overlapping the target sub-carrier associated with at least one of the user equipment or the repeater, wherein the at least one physical channel comprises at least one of a downlink physical channel or an uplink physical channel, wherein the at least one set of sub-carriers comprises useful data for the repeat transmission that is from at least a portion of a full channel bandwidth from which the useful data is taken, wherein the configuration message comprises at least one of a receive bandpass filter or a configurable transmit bandpass filter with a passband bandwidth and frequency offset that matches a signal bandwidth and a targeted frequency offset, wherein at least one of the configurable transmit bandpass filter or configurable receive bandpass filter, are configured to ensure that only useful data in the target sub-carrier can go through the repeater, and anything outside of the useful data will be suppressed, wherein shifting the at least one set of sub-carriers with the at least one physical channel to a different frequency offset is based on a maximum allowed separation between the at least one set of sub-carriers of the first communication link and the second communication link, wherein shifting the at least one set of sub-carriers with the at least one physical channel to a different frequency offset is based on user traffic associated with the user equipment, wherein based on the different frequency offset the indication of the configuration message is sent toward at least one of the user equipment or the repeater, wherein determining the configuration message is based on at least one of: a traffic payload to be transmitted between the network node and the user equipment at a specific time beginning at one of a particular slot or symbol, a maximum allowed separation between the at least one set of sub-carriers of the first communication link and the second communication link, a number of physical resource blocks of a subband bandwidth required for the at least one physical channel based on a traffic payload to be transmitted between the network node and the user equipment, or a starting frequency offset of a set of sub-carriers in a preferred frequency ranges of the at least one of the fronthaul link or the access link, wherein the indication of the configuration message sent towards at least one of the repeater or the user equipment is using a set of sub-carriers repetition configuration message, and/or wherein the set of sub-carriers repetition configuration message is sent based on the at least one sub-band being different between the fronthaul link and the access link.

In another example aspect of the invention, there is an apparatus comprising: means for determining, by a user equipment of a communication network, a configuration message from a network node comprising an identified frequency range of at least one of a first communication link between a donor and a repeater or a second communication link between a user equipment and the repeater for a repeat transmission in the communication network, wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and wherein mapping comprises performing spectral modification of resources to cause at least one of: sub-carrier shifting, wherein a sub-carrier is selected for the repeater to frequency shift to another part of the spectrum, based on instructions by the network node; sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one of the user equipment or the repeater; and using the configuration message for configuration at the user equipment of the at least one set of sub-carriers mapped with the at least one physical channel for the repeat transmission.

In accordance with the example embodiments as described in the paragraph above, at least the means for determining, performing, and using comprises a network interface, and computer program code stored on a computer-readable medium and executed by at least one processor.

BRIEF DESCRIPTION OF THE DRAWINGS:

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 19A shows an exemplary REPEATER SUB-BAND REPETITION CONFIGURATION message in accordance with example embodiments of the invention;

FIG. 19B shows an exemplary UE-SUBBAND-REPETITION-CONFIGURATION message in accordance with example embodiments of the invention; and FIG. 20, FIG. 21, and FIG. 22 each show a method in accordance with example embodiments of the invention which may be performed by an apparatus, such as an apparatus of FIG. 18.

DETAILED DESCRIPTION:

In example embodiments of this invention, there is proposed at least repeater operations by the Repeater Device which include frequency shifted sub-bands.

As similarly stated above, cellular repeaters are widely used to provide coverage extension in the 2G/3G/4G wireless networks. A repeater can receive a signal from the nearby base station, amplifies and retransmits it to the nearby user equipment in the downlink direction, and in the uplink direction, the repeater receives signals from the UE equipment, amplifies and retransmits to the base station.

Repeater can be used in 5GNR as well for coverage improvement:
  5GNR repeater is currently being standardized in 3GPP (WI: NR_Repeaters, WID: RP-210818)
    NR repeater is a new 3GPP Work Item for Release 17(RAN4) and Release 18 (RAN1 to 4),
      Smart Repeater (Repeater with beamforming capabilities) is a hot topic that will be covered in a follow-up WI,
    TS 38.106 is dedicated to the NR repeater specification, which is an extension of TS 36.106 (LTE Repeater); and
  NR Repeater has several advantages over Integrated Access and Backhaul (IAB), which is first released in 3GPP release 16:
    A repeater costs less than an IAB device,
    A repeater has lower latency than an IAB device,
    Non-Regenerative (repeater) vs. Regenerative (IAB); and
    A repeater has less energy consumption, smaller form factor and less weight for easier deployment.

It is noted that first Tier 5G service providers have already started the deployment of repeaters in their 5G network.

Figures 1, 2:
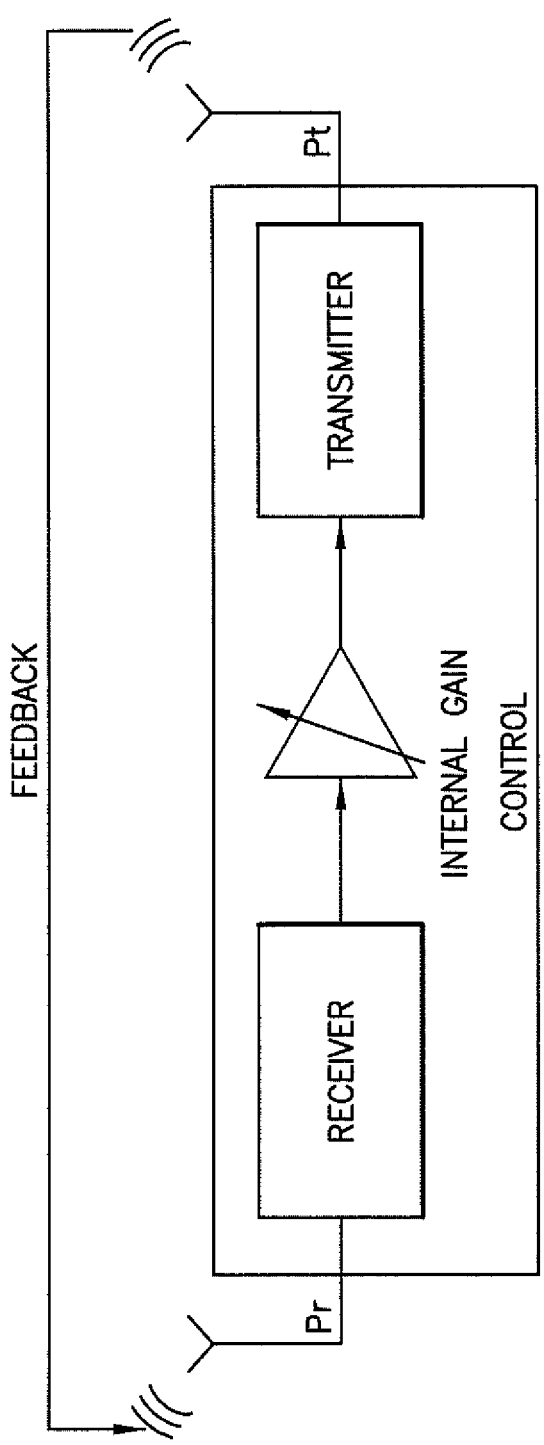
FIG. 1 shows an isolation Limitation in a Co-channel Repeater.
FIG. 2 shows Table 5.2-1: NR operating bands in FR1 (partial extract TS 38.101-2)

The conventional repeater has a number of performance limitations:
  The gain of the repeater is limited by the isolation between its transmit antenna on the service [or donor] side and the receive antenna on the donor [or service] side:
    In a co-channel repeater as shown in FIG. 1, the output signal at the transmit antenna with power level Pt is picked up by the receive antenna with measured power of Pr. The difference between the Pt and Pr is the isolation. In order for the repeater to provide coverage extension, the repeater has to have an internal gain, i.e. to amplify and re-send the input signal at the repeater output at a higher level,
    Self-oscillation can occur when the output signal from the transmitter antenna gets picked up by the receive antenna and passed through the repeater to be amplified again (i.e. positive feedback). When oscillation happens, the output signal will be distorted due to high signal level and the repeater becomes un-stable, The internal gain of the repeater must be smaller than this isolation (in fact, a lot smaller as it needs to leave additional headroom for the dynamic range of the signal and the targeted SNR). Smaller gain results in shorter distance to the donor gNB in the fronthaul link and smaller coverage area in the access link to the UE, To avoid self-oscillation, one could increase the isolation between the transmit antenna and the receive antenna, but this is not always possible due to 1). the environmental and/or physical constraints (e.g. the distance and orientations of the backhaul vs. the access antennas) during deployment. 2). design and manufacturing cost constraints, i.e. high isolation repeaters may be cost prohibitive, and Cross talk between the fronthaul section and access section of co-channel repeaters might result in additional interference.

The repeater can amplify noise and interference, thereby "pollute" the opposite sides of the repeater:

Conventional co-channel repeaters re-amplify the full carrier bandwidth,

As a coverage improvement device, for a repeater, it is conceivable that most probably only a fraction of the full bandwidth is utilized by the user traffic at any point of time.

The un-used sub-band may contain noise and interference as observed by the repeater in the access link or in the fronthaul link, and Since the conventional repeater amplify-forwards the full carrier bandwidth indiscriminately, undesired noise and interference in the un-used sub-band will be forwarded from access link to the fronthaul link and vice versa, which raises the noise floor in the victim cells (not limited to the donor cell or the repeater access cell) and degrades the network performance.

Regarding Band Shifting repeaters and backhauling solutions:

(1) Band shifting repeater:

The Frequency Shifting Repeater consists of a Master unit (MU) and a Remote unit (RU). The MU shifts the signals from working channels to unused channels at different frequencies and transmits to the RU. The RU shifts the received signals back to their original frequencies, amplifies and transmits to the coverage area, Differentiation:
Requires dual hop repeater, single hop not possible, and
Requires licensing of new "unused" channel.

(2) In-band backhauling solutions:

(2a) IAB (Integrated Access and Backhaul):
IAB decodes the incoming signal, combines the payload with other incoming signals, and creates a completely new outgoing signal. Strictly speaking it is not a repeater, but could be brought up as prior art,
Requires Baseband processor, "Band" here is the 3GPP meaning, where a band carries several channel bandwidths (CBWs) /component carriers (CCs) that are non-overlapping, and some are even FDD separated.

For example:

(2b) In Band Frequency Shift Repeater:
"The repeater system consists of two parts: Donor unit and remote unit. The Donor Unit receives the BTS signal via open air RF transmission or direct coupler closed to BTS, then converts it from the working frequency to the link frequency, and transmits the amplified signal to the Remote Unit that will reconvert the signal to the working frequency and provide the signal to the areas where network coverage is inadequate," and Differentiation:
Needs dual hop again to achieve isolation.
Same differentiation as in (1), and band definition of (2a).

(2c) Channel Selective—Frequency Shifting Repeater:
"The RF-1822 is a point-to-point or point-to-multipoint frequency shifting repeater system that overcomes the antenna isolation problem in conventional repeater system. The Master Unit (MU) receives the GSM1800 donor signal by either direct or wireless coupling, and translates it to another GSM1800 link frequency for transmission to the Remote Units (RU). The RU receives the link signals and translates them back to the original GSM1800 signals, which are then transmitted to the service areas,"

Block diagram of RF-1822 below shows the interworking between the Master Unit and the Remote Unit and the two frequency bands used, and Differentiation:
Needs dual hop again to achieve isolation:
The BS is unaware of the repeater (working frequencies f1/F1 at both eNB and mobile), and
The data sheet shows that f1 and f2 are on different CCs ("channels") with >=600 kHz separation.
Same differentiation as in (1), and band definition of (2a).

Figure 3:
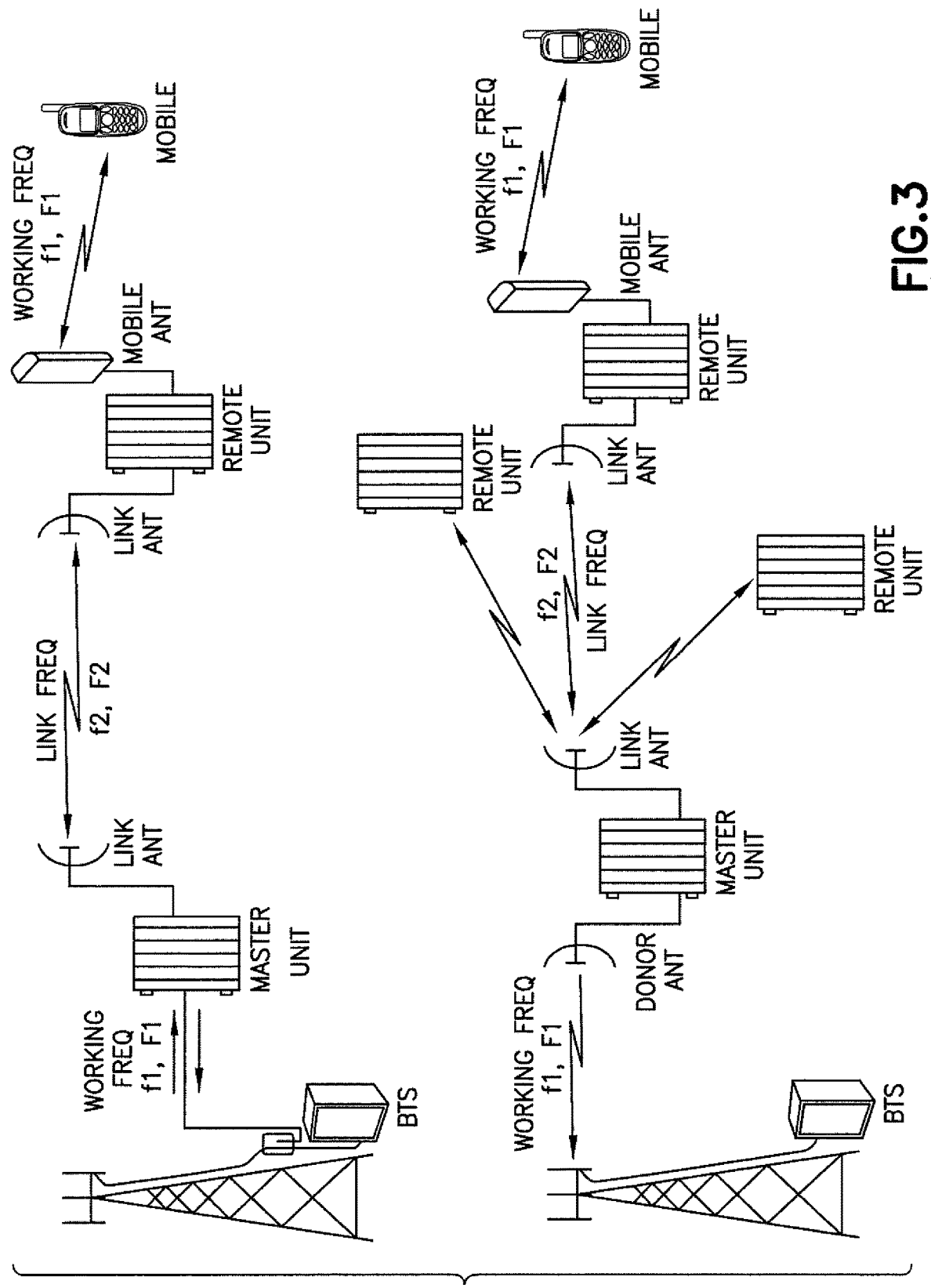
FIG. 3 shows interworking between the Master Unit and the Remote Unit in two frequency bands.

FIG. 3 shows interworking between the Master Unit and the Remote Unit in two frequency bands.

Example embodiments of the invention suggests using two different frequency dividers to generate two local oscillator signals in the repeater. The incoming signal will be demodulated using the first LO and re-modulate with the second LO to create a frequency shift, Use Local oscillator implies that this is a full bandwidth repeater, and This prior art also requires dual hop, i.e. another frequency shifting repeater to convert the signal from the second LO back to first LO.

FIG. 2 shows Table 5.2-1: NR operating bands in FR1 (partial extract TS 38.101-2). In FIG. 2 there is shown uplink and downlink operating bands for communication between a base station and a user equipment.

Example embodiments of the invention provides a method and a system for the repetition of a signal that occupies a sub-band within a carrier bandwidth or within a bandwidth part, or within any predefined frequency range. Additionally, example embodiments of the invention also provides the required signaling in order to allow such system to be used in 5G NR networks.

In one aspect, example embodiments of the invention provide a method for sub-band signal repetition through a Repeater Device, where the received signal in a first sub-band at the input of Repeater Device may be frequency shifted by the Repeater Device and retransmitted in a second sub-band at the output of the Repeater Device.

In 5GNR, the full bandwidth of a carrier (CC/CBW) or a bandwidth part (BWP) or any predefined frequency range, may be represented by the number of Physical Resource Blocks (PRBs). A sub-band, which occupies a portion of the full bandwidth, can also be uniquely identified by the sub-band bandwidth in PRBs and the frequency offset. The frequency offset is the frequency domain offset in the number of subcarriers to the lowest usable subcarrier in the full bandwidth. Each PRB has 12 subcarriers.

Figure 4:
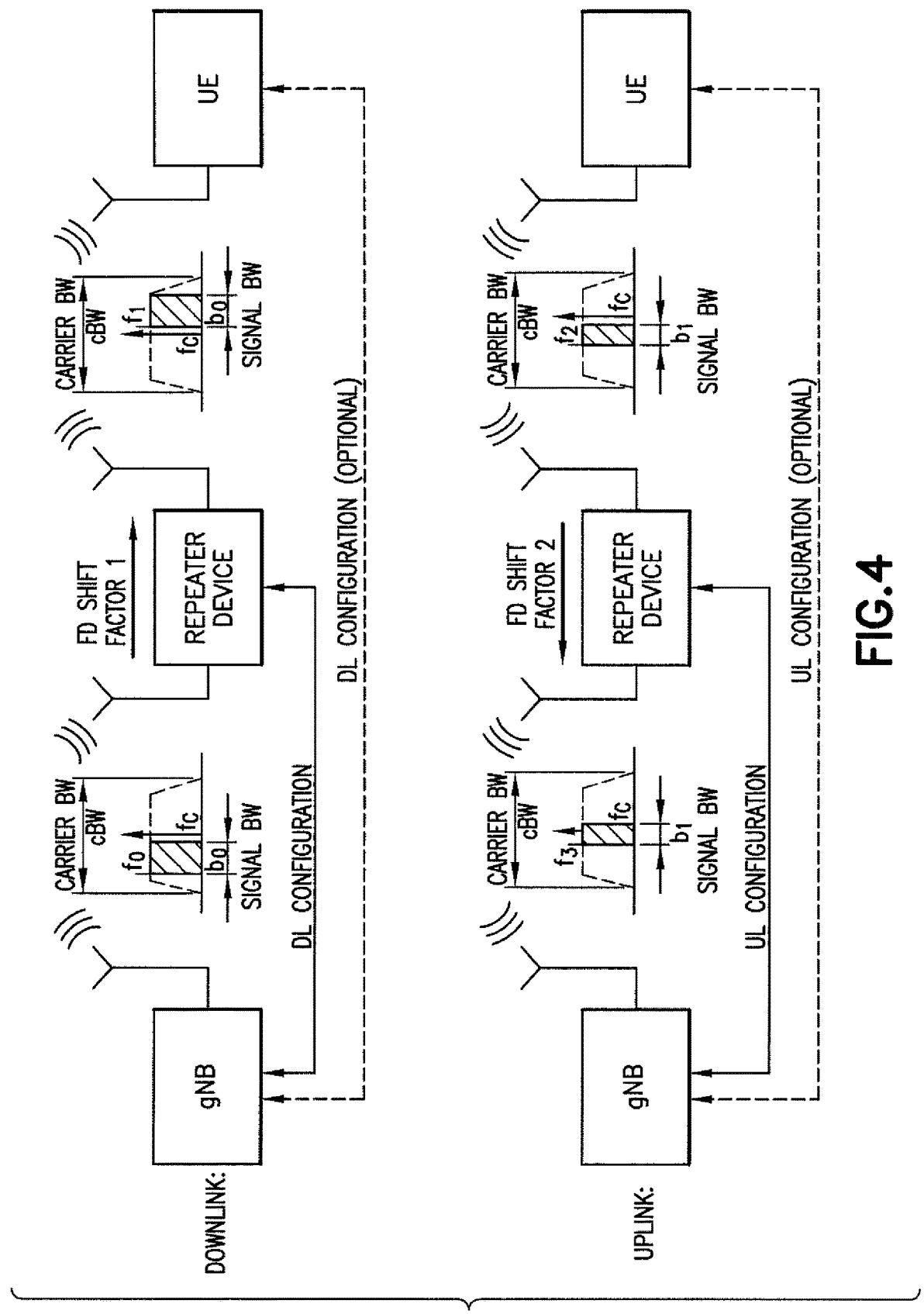
FIG. 4 shows Sub-band Signal Repetition.

As shown in FIG. 4, the gNB and the UE support a full carrier bandwidth of cBW with the carrier frequency of L. The actual user traffic between the gNB and the UE may use only a fraction of the full carrier bandwidth, which is represented as the shaded signal. In the downlink direction, the gNB transmits the output signal that has the sub-band bandwidth of bo and frequency offset of $f_0$ (shaded black signal) which is subsequently received by the repeater device. The repeater device maintains the signal bandwidth at bo but shifts the frequency offset to $f_1$, as a result, the signal transmitted by the repeater (shaded red signal) now uses a new sub-band before reaching the receive antenna of the user equipment. Similarly, in the uplink direction, the User Equipment transmits the output signal that has the sub-band bandwidth of $b_1$ and frequency offset of $f_2$ (shaded black signal) which is subsequently received by the repeater device. The repeater device maintains the signal bandwidth at $b_1$ but shifts the frequency offset to $f_3$, as a result, the signal transmitted by the repeater (shaded red signal) now uses a new sub-band before reaching the receive antenna of gNB. The Frequency Domain (FD) shift factor represents the change in the frequency offset from the incoming sub-band to the outgoing sub-band, e.g. in FIG. 4, FD shift factor 1 equals $f_1-f_0$ and FD shift factor 2 equals $f_3-f_2$.

Configuration channels are established between gNB and the Repeater or (optionally) between gNB and the UE to control the frequency shift and the filtering of the sub-band signals in the downlink and uplink, respectively.

Example embodiments of the invention addresses the self-oscillation problem in the conventional co-channel repeater, where the incoming signal and outgoing signal have identical waveform in the time domain (with different power level), thus the transmitter and receiver feed into each other and results in self-interference and instability.

By performing the frequency shifting, the incoming signal and the outgoing signal are on different sub-bands, thereby the outgoing signal has a very different waveform from that of the incoming signal in the time domain. The level of self-interference is greatly reduced.

Figure 18:
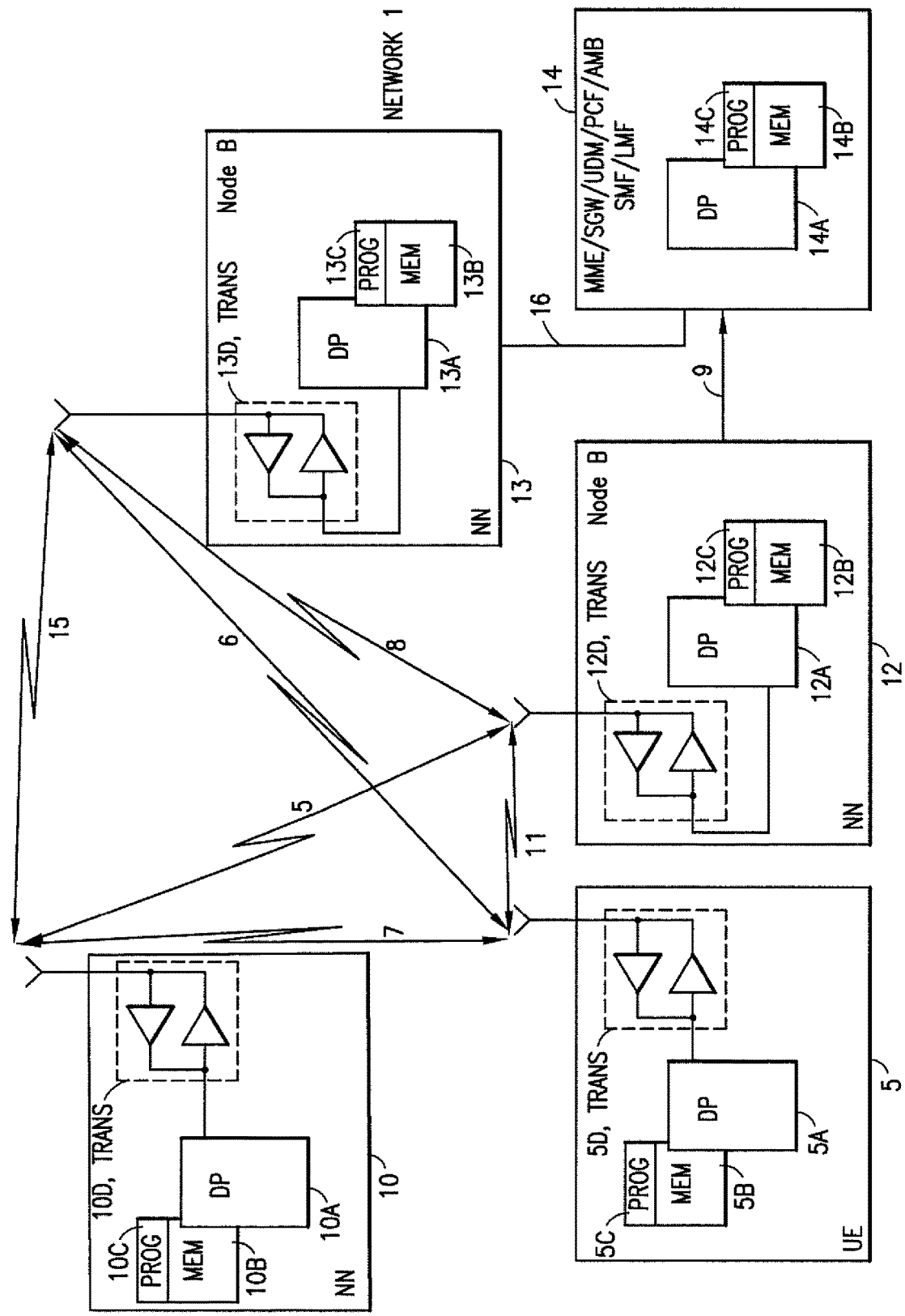
FIG. 18 shows a simplified block diagram of various electronic devices of one possible and non-limiting example system that can be suitable for use in practicing the example embodiments of the invention.

Before describing the example embodiments of the present disclosure in detail, reference is made to FIG. 18 for illustrating a simplified block diagram of various electronic devices of one possible and non-limiting exemplary system that are suitable for use in practicing the example embodiments of the present disclosure.

FIG. 18 shows a block diagram of one possible and non-limiting exemplary system in which the example embodiments of the present disclosure may be practiced. In FIG. 18, a user equipment (UE) 10 and a user equipment (UE) S is in wireless communication with a wireless network 1 or network 1 as in FIG. 18. The wireless network 1 or network 1 as in FIG. 18 can comprise a communication network such as a mobile network e.g., the mobile network 1 or first mobile network as disclosed herein. Any reference herein to a wireless network I as in FIG. 18 can be seen as a reference to any wireless network as disclosed herein. Further, the wireless network 1 as in FIG. 18 can also comprises hardwired features as may be required by a communication network. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 5 (user equipment 5) includes one or more processors DP 5A, one or more memories MEM 5B, and one or more transceivers TRANS 5D interconnected through one or more buses. Each of the one or more transceivers TRANS 5D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 5D which can be optionally connected to one or more antennas for communication to NN 12 and NN 13, respectively. The one or more memories MEM 5B include computer program code PROG 5C. The UE 5 communicates with NN 12 and/or NN 13 via a wireless link 11 and link 6, respectively. The one or more memories MEM 5B and the computer program code PROG 5C are configured to cause, with the one or more processors DP 5A, the UE 5 to perform one or more of the operations as described herein.

The NN 10 (repeater 10) includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS IOD which can be optionally connected to one or more antennas for communication to NN 12 and NN 13, respectively. The one or more memories MEM 10B include computer program code PROG 10C. The NN 10 communicates with NN 12 and/or NN 13 via a wireless link 5 and wireless link 15, respectively. In addition, the NN 10 communicates with UE 5 via a wireless link 7. The one or more memories MEM 10B and the computer program code PROG 10C are configured to cause, with the one or more processors DP 10A, the NN 10 to perform one or more of the operations as described herein.

The NN 12 (NR/5G Node B, an evolved NB, NR/5G device or LTE device) is a network node such as a master or secondary node base station (e.g., for NR or LTE long term evolution) that communicates with devices such as NN 13, UE 5, and/or NN 10 of FIG. 18. The NN 12 provides access to wireless devices and/or wired devices such as the UE 5 and/or the NN 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn and/or other interfaces for use to perform the example embodiments of the present disclosure. Each of the one or more transceivers TRANS 12D includes a receiver and a transmitter. The one or more transceivers TRANS 12D can be optionally connected to one or more antennas for communication over at least link 11 and/or link 5 and/or link 8 , The TRANS 12D can connect with the UE 5 and/or NN 10 via links 11 or link 5, respectively. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13 such as via link 8. Further any of the links as disclosed herein may be wired or wireless or both. Further any of the links as disclosed herein may be configured to be through other network devices such as, but not limited to an SGW/AMF/UPF device such as the MME/SGW/UDM/PCF/AMF/SMF/LMF 14 of FIG. 18. The NN 12 may perform functionalities of a Mobility Management Entity (MME), Serving Gateway (SOW), Unified Data Management (UDM), Policy Control Function (PCF), User Plane Function (UPF), Access and Mobility Management Function (AMF) and/or a Location Management function (LMF) for LTE and similar functionality for 5G.

The NN 13 (NR/5G Node B, an evolved NB, NR/5G device or LTE device) is also a network node such as a master or secondary node base station (e.g., for NR or Li E) that communicates with devices such as NN 12, UE 5, and/or NN 10 of FIG. 18. The NN 13 can be associated with a mobility function device such as an AMF or SMF, further the NN 13 may comprise a NR/5G Node B or possibly an evolved NB, a base station such as a master or secondary node base station (e.g., for NR or LTE) that communicates with devices such as the NN 12 and/or UE 5 and/or NN 10 in the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces and/or other interfaces for use to perform the example embodiments of the present disclosure. Each of the one or more transceivers TRANS 13D includes a receiver and a transmitter that can optionally be connected to one or more antennas. The one or more memories MEM 13B include computer program code PROG 13C. For instance, the one or more memories MEM 13B and the computer program code PROG 13 C are configured to cause, with the one or more processors DP 13A, the NN 13 to perform one or more of the operations as described herein. The NN 13 may communicate with the NN 10 and/or the HE 5 or any other device using, e.g., at least link 15 and/or link 6. The link 8 as shown in FIG. 18 can be used for communication between the NN12 and the NN13. It is noted that any of the link as disclosed herein can comprise one or more links. In addition, any of these links.

It is noted that that the NN 12 and/or the NN 13 can be configured (e.g. based on standards implementations etc.) to perform functionality of a Location Management Function (LMF). The LMF functionality may be embodied in either of the NN 12 or NN 13 or may be part of these network devices or other devices associated with these devices. In addition, an LMF such as the LMF of the MME/SGW/LTDM/PCF/AMF/SMF/LMF 14 of FIG. 18, as at least described below, can be co-located with the NN 12 and/or NN 13 such as to be separate from the NN 12 and/or NN 13 of FIG. 18 for performing operations in accordance with example embodiments of the invention as disclosed herein.

Figure 6:
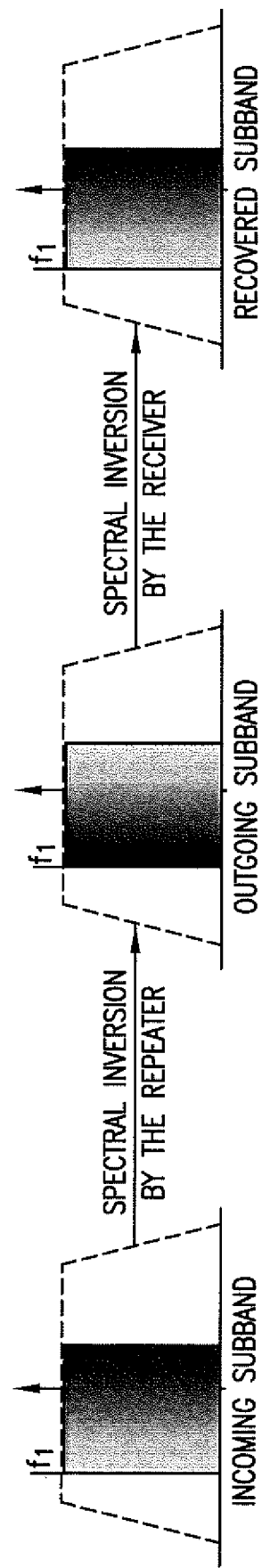
FIG. 6 shows spectral inversion when incoming sub-band is identical to the outgoing sub-band.

These links, for instances, links 5, 6, 7, 8, 11, 15, 16, and 9 maybe wired or wireless or both and the links and/or other interfaces such as being shown in FIG. 18 or FIG. 6 may implement Xn/X2 e.g., link 8 between the NN 12 and the NN 13 can include an X2/Xn interface type link. Further, as stated above any of these links may be through other network devices such as, but not limited to an MME/SGW device such as the MME/SGW/UDM/PCF/AMF/SMF/LMF 14 of FIG. 18. The MME/SGW/UDM/PCF/A1V1F/SMF/LMF 14 of FIG. 18 may be used to control any functions of any of the devices of the Network 1 as shown in FIG. 18.

The one or more buses of the device of FIG. 18 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D, TRANS 5D, and/or TRANS 10D may be implemented as a remote radio head (RRH), with the other elements of the NN 12 being physically in a different location from the RRH, and one or more buses could be implemented in part as fiber optic cable to connect the other elements of the NN 12 to a RRH for example.

It is noted that although FIG. 18 shows network nodes such as NN 10, NN 12, and NN 13. Any of these nodes may can incorporate or be incorporated into an eNodeB or eNB or gNB or a computer type server such as for LTE and NR, and would still be configurable to perform example embodiments of the present disclosure.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 or any network it can represent may or may not include a MME/SGW/UDM/PCF/AMF/SMF/LMF 14 that may include Mobility Management Entity (MME), and/or Serving Gateway (SGW), and/or Unified Data Management (UDM), and/or Policy Control Function (PCF), and/or Access and Mobility Management Function (AMF), and/or Session Management Function (SMF) , and/or Authentication Server Function (AUSF) and/or Location Management Function (LMF) and which provides connectivity with a further network, such as a telephone network and/or a data communications network (e.g., the Internet), and which is configured to perform any 5G and/or NR operations in addition to or instead of other standards operations at the time of this application. The MME/SGW/UDM/PCF/AMF/SMF/LMF 14 is configurable to perform operations in accordance with example embodiments of the present disclosure in any of an L l'E, NR, 5G and/or any standards based communication technologies being performed or discussed at the time of this application. In addition, it is noted that the operations in accordance with example embodiments of the present disclosure, as performed by the NN 12 and/or NN 13, may also be performed at the MME/SGW/UDM/PCF/AMF/SW/LMF 14.

Regarding the LMF functionality of the MME/SGW/UDM/PCF/AMF/SMF/LMF 14 of FIG. 18, the LMF receives measurements and assistance information from the communication network and user equipment (UE). This can be via an Access and Mobility Management Function (AMF) over an interface to determine a position of the UE. The UE 5 and/or the NN 10 as in FIG. 18 may communicate with the LMF via at least any of links 5, 6, 11, and/or 15. The NN 12 and/or NN13 can if necessary then further communicate with the LMF of the MME/SGW/UDM/PCF/AMF/SMF/LMF 14 of FIG. 18 via the link 16 or link 9 as in FIG. 18.

It is noted that the link 16 or link 9 can include any links needed between UE 5, NN 10, NN 12, and/or NN 13 and the MME/SGW/UDM/PCF/AMF/SMF/LMF 14 of FIG. 18 for any of these devices to communicate with at least the LMF of the MME/SGW/UDM/PCF/AMF/SMF/LMF 14 of FIG. 18. Further, it is noted that any of links that are mentioned in this paper can include hardwired links and/or wireless links and, as needed, and/or include any type of interface (e.g., LTE and/or 5G interface) such as but not limited to at least one of an Xn, X2, S1, NG, NG-C, NLs, E1, and/or F1 type interface.

The MME/SGW/UDM/PCF/A1V1F/SMF/LMF 14 includes one or more processors DP I4A, one or more memories MEM 14B, and one or more network interfaces (N/W I/F(s)), interconnected through one or more buses coupled with at least links 16 and 9. Communication between the NN 12 or NN 13 and the LMF may be performed via an Access and Mobility Management function (AMF) e.g., of the MME/SGW/UDM/PCF/AKF/SMF/LMF 14. A control plane interface between NN 12 and/or NN 13 (or a gNB) and AMF can be an NG-C interface and an interface between the AMF and LMF can be NLs. In accordance with the example embodiments these network interfaces can include X2 and/or Xn and/or other interfaces for use to perform the example embodiments of the present disclosure. The one or more memories MEM 14B include computer program code PROG 14C. The one or more memories MEM14B and the computer program code PROG 14C are configured to, with the one or more processors DP 14A, cause the MME/SGW/UDM/PCF/AMF/SMF/LMF 14 to perform or work with the NN 12 or NN 13 to perform one or more operations which may be needed to support the operations in accordance with the example embodiments of the present disclosure.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, DPSA, and/or DP14A and memories MEM 10B, MEM 12B, MEM 13B, MEM 5B, and/or MEM 14B, and also such virtualized entities create technical effects.

The computer readable memories MEM 12B, MEM I3B, MEM 5B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, MEM 5B, and MEM 14B may be means for performing storage functions. The processors DP10, DP12A, DP13A, DP5A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, DP5A, and DP14A may be means for performing functions, such as controlling the NN 10, UE 5, NN 12, NN 13, and other functions as described herein.

In general, various embodiments of the UE 5 and/or NN 10 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

As similarly stated above example embodiments of the invention addresses the self-oscillation problem in the conventional co-channel repeater, where the incoming signal and outgoing signal have identical waveform in the time domain (with different power level), thus the transmitter and receiver feed into each other and results in self-interference and instability.

By performing the frequency shifting, the incoming signal and the outgoing signal are on different sub-bands, thereby the outgoing signal has a very different waveform from that of the incoming signal in the time domain. The level of self-interference is greatly reduced.

Figure 5:
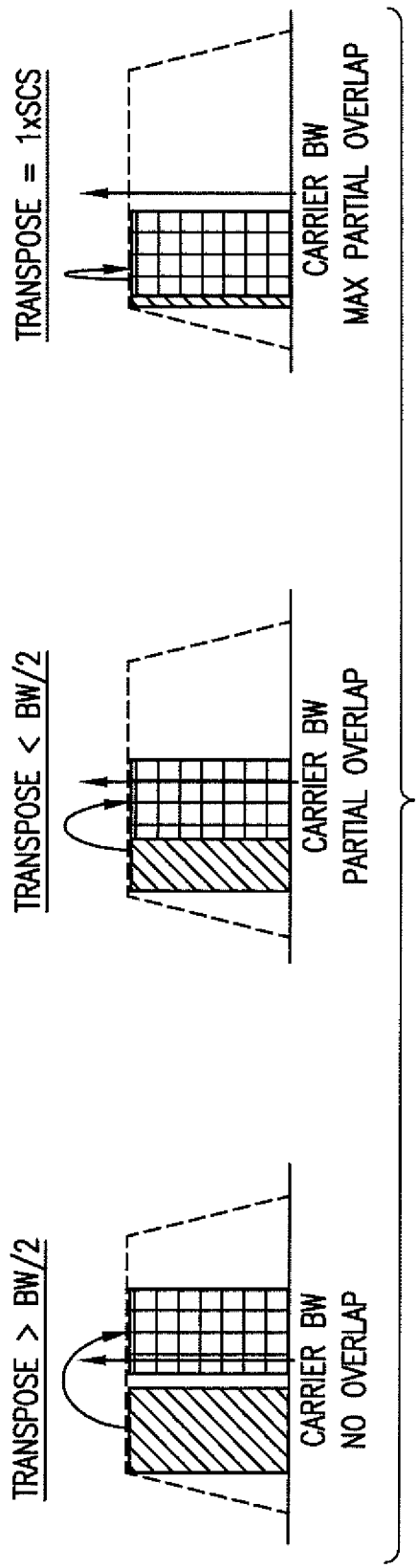
FIG. 5 shows Permissible Overlap Regimes.

We note that the shifted sub-bands can be allowed to have various degree of overlap in the frequency domain, as shown in FIG. 5 (with one additional special case shown in FIG. 6), where the shaded black signal represents the incoming sub-band and the shaded red signal represents the outgoing sub-band through the sub-band Repeater. Even partially overlapped sub-bands increase the isolation while as non-overlapped sub-bands increase the isolation to infinity.

It is submitted that a large part of the isolation gain can already be obtained by a shift of a single subcarrier (i.e. Max Partial Overlap).

When the incoming sub-band and the outgoing sub-band do not overlap, maximum isolation can be achieved as there will not be any oscillation:
Note: This is the ideal case assuming prefect "square" filters with infinite stopband attenuation. In practice, filters leak energy outside their specified corner frequencies and minor oscillations are to be expected. Those remaining oscillations can be reduced by allocating additional gaps between the incoming sub-band and the outgoing sub-band to account for the filter roll-off.

The incoming sub-band and the outgoing sub-band may partially overlap when, for example, the bandwidth of the user traffic is higher than one half of the carrier bandwidth. Due to the frequency shift, the time domain waveform of the outgoing signal may still substantially differ from the incoming signal. As a result, the self-interference due to radio signal feedback from the transmitting to the receiving antenna is greatly reduced.

Frequency shift of even one subcarrier between the incoming sub-band and outgoing sub-band can already make the time domain waveform of outgoing signal look very different from that of the incoming signal.

In the special case where the incoming sub-band completely overlaps with the outgoing sub-band with no frequency shift, e.g. when the user signal occupies the entire carrier bandwidth, example embodiments of the invention suggest a spectral inversion filter be applied to generate a mirror image in the frequency domain of the signal in the sub-band, such that the incoming signal and outgoing signal different in the time domain to avoid self-interference. The flipped spectrum can be inversed back by the receiver entity, e.g. a gNB or a UE, as shown in FIG. 6.

Note that the gNB has the ability to avoid the fully overlapped sub-band situation as it has full control of the physical resource assignment. Thereby this case is listed here for completeness.

Figures 7, 8:
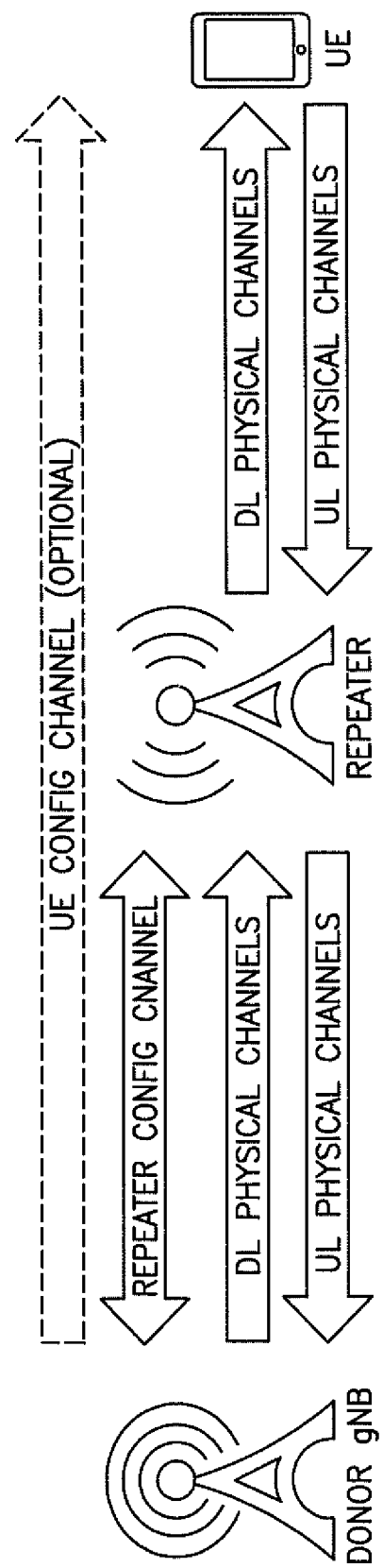
FIG. 7 shows a spectral flipping example.
FIG. 8 shows Interworking of the Sub-band Repeater with the gNB and the UE in 5G Networks.

A numeric toy example of "spectral flipping" can be seen in FIG. 7, which shows a spectral flipping example.

In another aspect, example embodiments of the invention provide the required signalling to enable a sub-band repeater in a 5G NR network. The signalling is designed to maximally leverage the existing 5G NR physical channels while at the same time exploit the performance benefit of the method of sub-band signal repetition.

One preferred embodiment of NR communication network that comprises a Donor gNB, a Sub-band Repeater and a UE is shown in FIG. 8.

The radio link between the Donor gNB and the Sub-band Repeater is referred to as the fronthaul link; the radio link between the Sub-band Repeater and the UE is referred to as the access link. The Downlink Physical Channel signal is transmitted by the Donor gNB in the fronthaul link, received and retransmitted by the sub-band Repeater and subsequently received by the UE; The Uplink Physical Channel signal is transmitted by the UE, received and retransmitted by the Sub-band Repeater and subsequently received by the gNB.

The Downlink Physical Channel signal comprises one or a plurality of 5g NR downlink physical channels, including DL Reference Signals, SSB, PDCCH and PDSCH. The Uplink Physical Channel Signal comprises one or a plurality of 5g NR uplink physical channels, including UL Reference Signals, PUCCH, PUSCH and PRACH.

Example embodiments of the invention propose that the procedure to generate these Physical Channels remain unchanged, but the physical resource mapping of these Physical Channels may be shifted to a different frequency offset to support sub-band repetition. Such frequency shift may be corrected by the sub-band repeater or optionally by the UE on the downlink or by the gNB on the uplink, such that the correct Physical channels can be restored.

The gNB communicates with the repeater through a configuration channel. The configuration channel carries the sub-band information of the incoming Physical channel signal and the frequency shift to be applied to construct the outgoing Physical Channel signal in the new sub-band.

The gNB optionally communicates with the UE through a configuration channel. The UE configuration channel carries the sub-band information of the physical channels on the access link and the frequency shift from the target sub-band in the UE.

Example embodiments of the invention also propose a scheme for interworking/signalling between the Donor gNB, the sub-band Repeater and the UE to support sub-band repetition in 5GNR networks.

As a quick summary:
1. The gNB determines the frequency ranges that are favorable for transmission in the fronthaul link and the access link,
2. The gNB determines the sub-band bandwidth required for the physical channels.
3. The gNB places the physical channels in the favorable frequency ranges in the fronthaul link and the access link. The gNB may attempt to make the sub-band in the access link and sub-band in the fronthaul link as far apart as possible (i.e. with the least overlap),
4. The gNB sends configuration message to the repeater on the sub-band in the fronthaul link and the required frequency shift for the sub-band in the access link in the downlink direction; similarly the sub-band in the access link and the required frequency shift for the sub-band in fronthaul link in the uplink direction, and
5. The gNB sends configuration message to the UE on the required frequency shift if there is a need for the UE to perform frequency shift in physical resource mapping or physical resource de-mapping.

Figure 9:
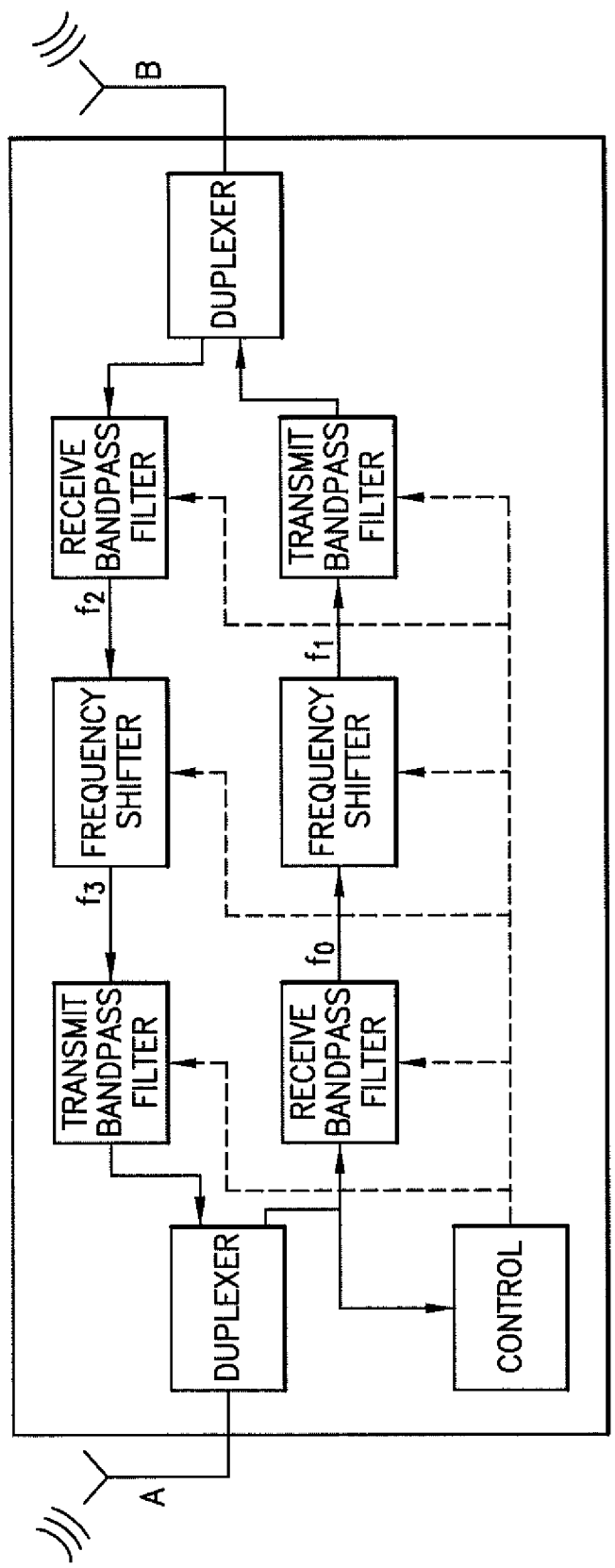
FIG. 9 shows a Sub-band Repeater implementation.

An exemplary Repeater Device implementation for sub-band signal repetition is shown in FIG. 9. The Sub-band Repeater Device is bi-directional, i.e. the incoming signal from antenna A of the repeater device will be repeated at the antenna B in the forward direction, while as the received signal from antenna B of the Repeater Device will be repeated at the antenna A in the reverse direction. Signals from the forward and reverse directions are mixed together through Duplexer to the same antenna.

Said implementation can comprise:
1) A configurable Receive Bandpass Filter with the passband bandwidth and the frequency offset $f_0$ match that of the bandwidth and frequency offset of the received signal at the antenna input. The Receive Bandpass Filter serves to let through the sub-band signal whiles as suppress any other signals outside the sub-band. The granularity of the received signal bandwidth can be as few as one subcarrier or as many as one subcarrier less than the total number of the data subcarriers of the full carrier bandwidth.
2) A configurable Frequency Shift filter that moves the frequency offset of the filtered signal after step 1) from frequency offset $f_0$ to a new frequency offset $f_1$ without changing the signal bandwidth. The amount of frequency shift is constrained within a boundary such that the new pass band is still within the full carrier bandwidth. The granularity of the frequency shift can be as few as one subcarrier spacing.
3) A configurable Transmit Bandpass Filter with the passband bandwidth and the frequency offset match that of the signal bandwidth and the frequency offset $f_1$. The Transmit Bandpass filter enables the transmission of the shifted signal at the new sub-band while as suppresses any other signals that may be present outside this sub-band but still within the full carrier bandwidth.
4) Similar operation can be performed in the forward direction as well as the reverse direction.
5) The Repeater Device also comprises a Control Block that receives configuration messages from the gNB and configures the Receive Bandpass Filter, the Frequency Shift Filter and the Transmit Bandpass Filter dynamically. The configuration messages from the gNB may contain parameters such as the sub-band $inf_0$ of the incoming signal and the amount of frequency shift in order to generate the new sub-band for the outgoing signal, in addition to the timing information. The forward path and the reverse path can have different configurations.
6) The filtering operation mentioned in 1) to 4) above can be performed in the radio frequency (RF) or in the Intermediate Frequency (IF) or in the baseband.

Note: The "spectral flipping" implementation is different and known methods via modified passband filters are available.

Some novelties in accordance with some example embodiments of the invention are as follows:
i. Comparing to the conventional full carrier bandwidth repeater, example embodiments of the invention repeat only a fraction of the full channel bandwidth (CC/CBW), i.e., we only repeat the sub-band where the useful signal resides,
ii. The repetition of a sub-band signal also includes an in-carrier-channel ("in-CC") frequency shift before transmission such that the incoming sub-band differs from the outgoing sub-band. As a result of the frequency shift, the time domain waveform of the outgoing signal will be very different from the incoming signal (i.e. the feedbacked outgoing signal will be out of phase with the incoming signal at the repeater input). Thereby the self-oscillation due to self-interference can be much reduced or even eliminated,
iii. Partial overlap of incoming sub-band and outgoing sub-band are explicitly included. No prior arts teach partial overlap. And in particular not any shifting of the frequency domain resource allocation (FDRA) within the same component carrier (CC). Presumably, this has Base Station scheduler impact. ("Spectral flipping" can additionally be applied for potentially increased isolation but is not required),
iv. Full overlap of incoming sub-band and outgoing sub-band are explicitly included; requires the "spectral flipping" function,
v. The sub-band bandwidth and frequency shift are dynamically adjusted according to user traffic. Prior arts configure once during power-up/deployment,
vi. In one embodiment, the Base Station can anticipate the physical sub-band shift applied at the repeater to make the process completely transparent to the UE.
   This solution also requires adaptation of the RRC payload, which requires special treatment of direct access UEs and "repeater access UEs", This is later solved in a 5G NR using "GCSN illegal" signaling of the mostly duplicated messages, and
vii. Corresponding (3 GPP compliant) signaling between donor and repeater, and between donor and UE.

The benefits of some example embodiments of the invention are as follows:
i. Sub-band Repeater offers better performance than the conventional full carrier bandwidth repeater:
   a. By using a band pass filter, Sub-band Repeater amply-forwards the signal only in the sub-band it uses and suppresses noise and the interference in the unused sub-bands. Sub-band Repeater avoids the problem of the conventional full band repeater where the unwanted signal in the unused sub-bands from the receiving side of the repeater is amplified and forwarded to the transmitter side, which raises the noise floor and degrade the performance.
       Thus, it helps as well to suppress the mixing of unwanted out-of band noise contributions into the signal band caused by nonlinearities in the transmitter chain.
   b. Sub-band Repeater enables frequency selective transmission / reception:
       The fronthaul link and the access link may have very different channel conditions, it may be advantageous to use separate sub-bands to exploit different frequency diversity in both links for optimal performance. This sub-band repetition with frequency shift method provides a perfect solution.
   c. Sub-hand Repeater enables the transmitter side to use higher power (focus the power to the sub-band in use) to improve signal quality or coverage. In contrast, conventional repeater distributes its power evenly across the full bandwidth and is sub-optimal.
ii. Sub-band Repeater provides larger range extension than the conventional full band repeater:
   a. By performing an in-band frequency shift, the input signal and the output signal can be substantially different, which lessens or even eliminates the chance of self-oscillation. Conventional repeater just re-amplify the same input signal to the output in the identical frequency band and as a result, it's internal gain is constrained by oscillation induced by self-interference.
   b. Sub-band repeater enables multi-hop signal repetition through applying different frequency shifts between different hops of the repeater nodes to avoid self-interference. Multiple hops of the conventional repeaters amplify the noise and interference through multiple hops in a cascaded fashion and are prone to self-oscillation and echoing.
iii. Sub-band Repeater enables user specific signal repetition:
   a. Example embodiments of the invention can be used to support signal repetition for multiple users that are spatially separated. For example, use bandpass filter to separate different frequency domain multiplexed users and repeat the respective signal in different spatial directions using beamforming technique:
       Example embodiments of this invention are supportive to the beamforming repeater topic.
   b. In contrast, conventional repeater is cell specific and can't separate user signals.

Figure 10:
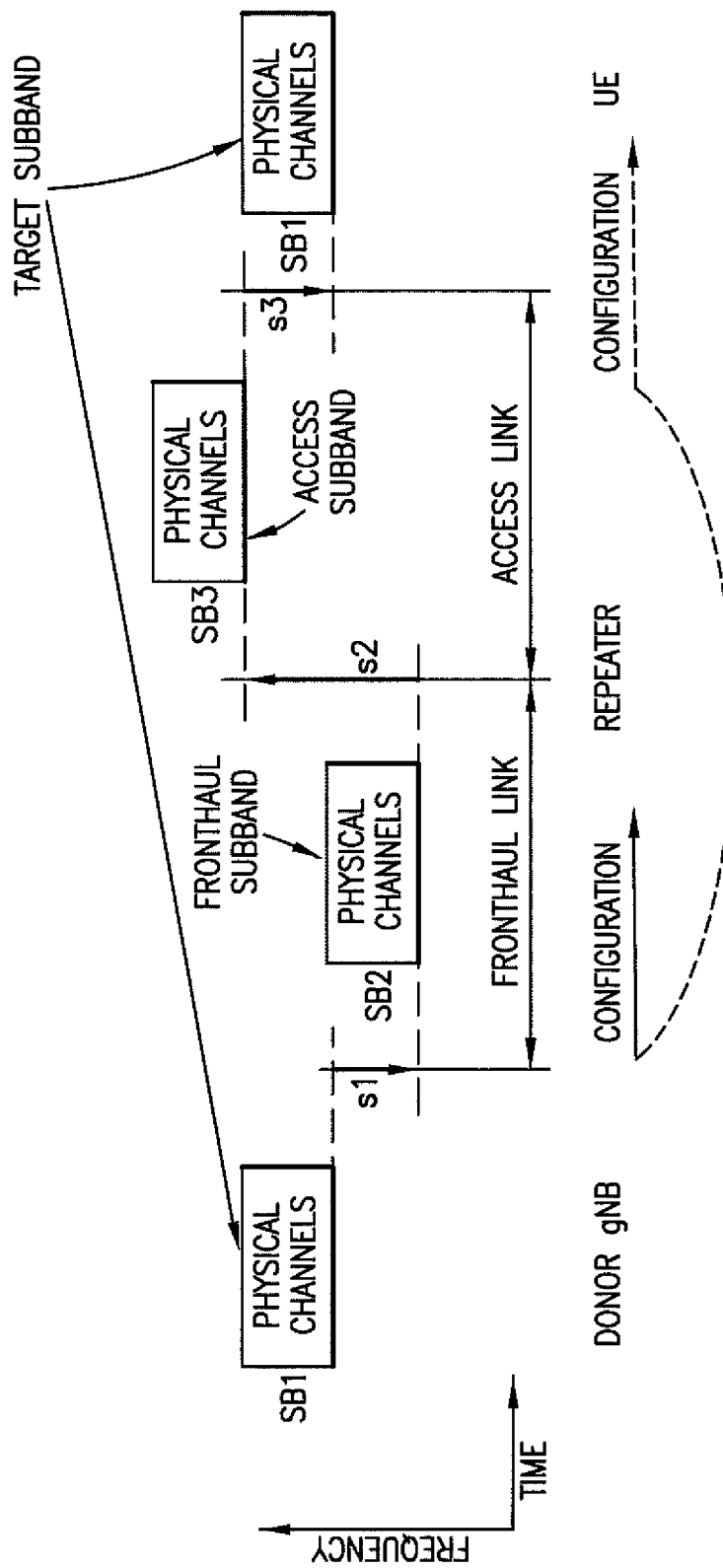
FIG. 10 shows a 5GNR Physical Channel Sub-band Transpose.

More detailed description for the physical channel handling to support sub-band repetition in 5GNR networks can be seen in FIG. 10.

The Physical Channels as shown are either Downlink Physical Channels or Uplink Physical Channels as defined by 3GPP. The Downlink Physical Channel signal comprises one or a plurality of 5g NR downlink physical channels, including DL reference signals, SSB, PDCCH and PDSCH. The Uplink Physical Channel signal comprises one or a plurality of 5g NR uplink physical channels, including UL reference signals, PUCCH, PUSCH and PRACH. The physical channels may occupy a certain sub-band which is identifiable by the sub-band bandwidth in the number of PRBs and the frequency offset in the number of subcarriers.

The Sub-band 1 (SB1) is the target sub-band which the gNB and the UE originally intend to use, the information carried in the physical channels, such as physical control channels (PDCCH) is compatible with the target sub-band. As we have pointed out earlier, using the same SB1 in the fronthaul link and the access link through the repeater may generate self-interference and oscillation. Example embodiments of the invention propose that sub-bands used in the front link or the access link be different from the target sub-band, shown as SB2 and SB3 in FIG. 1 Orespectively. The value S1, S2, S3 represent the needed shift in the frequency domain to transpose from one suband to the other.

It's worthy to note that for gNB and the UE, such frequency domain shift involves just physical resource mapping or de-mapping, while as for the sub-band repeater, it involves a plurality of filters to ensure only the desired sub-band signals are repeated and optimal frequency offset (S2) is applied between the sub-band for the fronthaul link and the sub-band for the access link to establish maximal isolation.

Hence, as a mental short cut, one could denote S2 as being a physical frequency shift, while S1/3 could be called logical shifts, or logical mappings. Though the practical outcome of both approaches is a signal on a different physical frequency.

Separately the Donor gNB establishes a configuration channel with the Repeater to inform the parameters for the incoming sub-band and the frequency shift needed to generate the output sub-band signal, in addition to the time instant to apply the said configuration parameters.

When the access sub-band is different from the target sub-band, the gNB establishes a configuration channel with the UE to inform the parameters for the intend frequency shift from the target sub-band, in addition to the time instant to apply the said configuration parameters.

Figure 11:
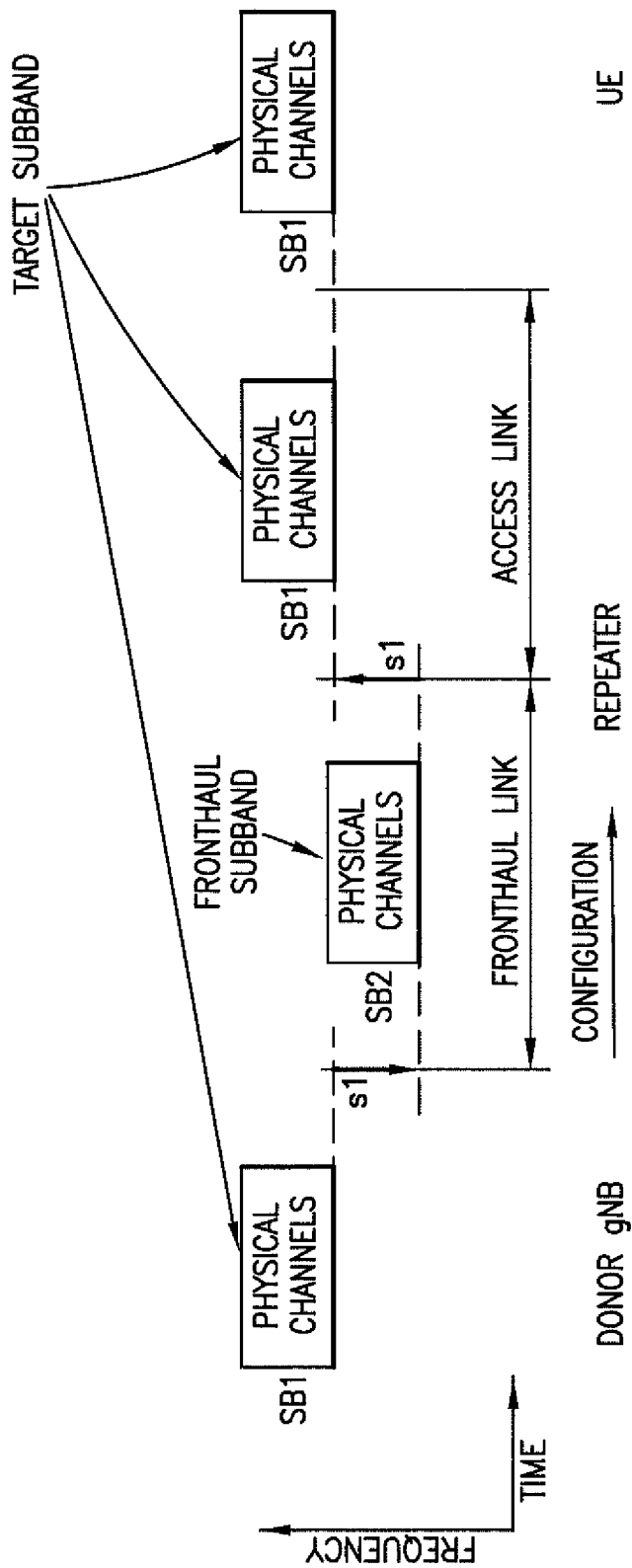
FIG. 11 shows a Physical Channel sub-band transpose when it is transparent to the UE.
Figure 12:
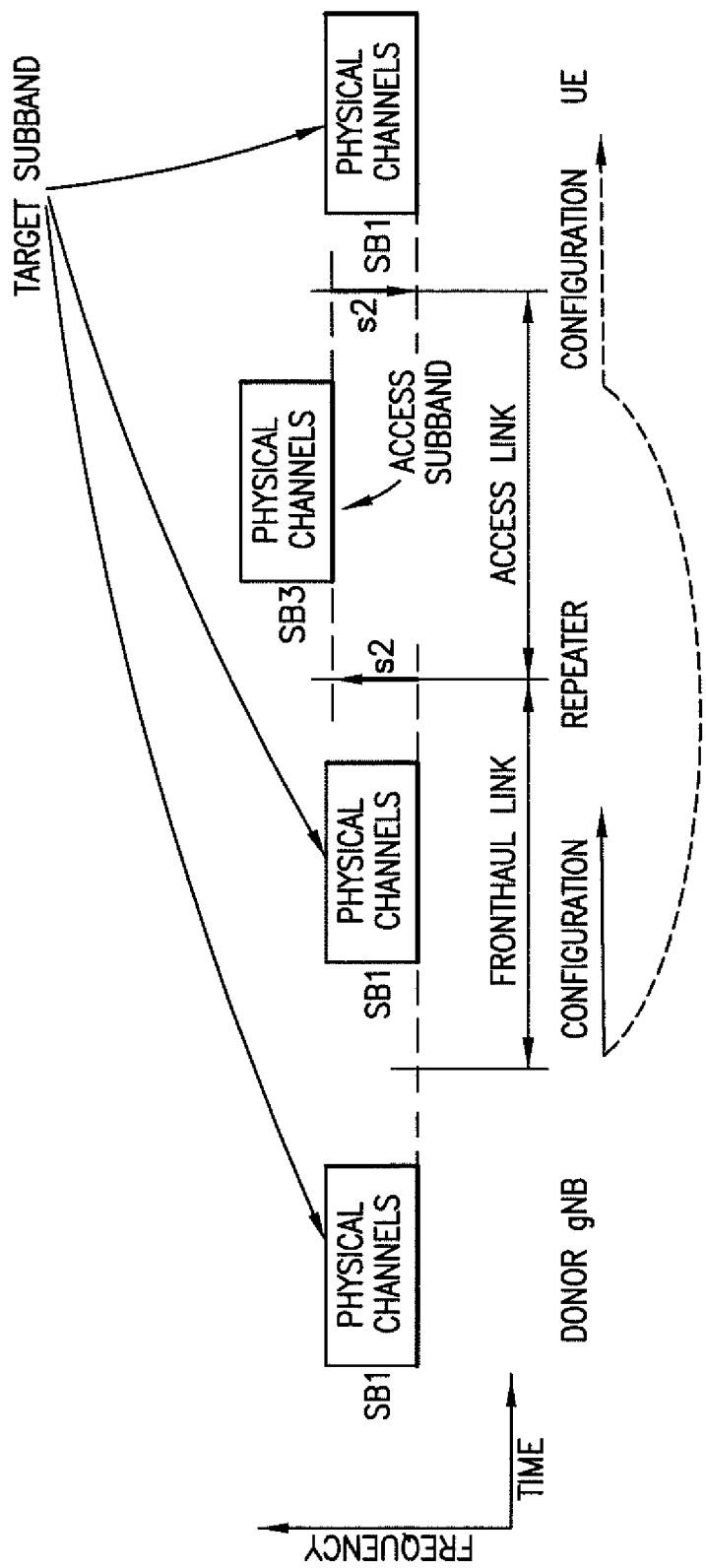
FIG. 12 shows a Physical Channel sub-band transpose when it is transparent to the gNB.

Two simplified embodiments of FIG. 10 are also considered:

1) As shown in FIG. 11, the sub-band in the access link is identical to the target sub-band. In other words, the sub-band transpose of frequency offset Si by the gNB is restored to the target sub-band by the sub-band repeater, thereby this configuration is UE transparent. There is no need for configuration channel from the gNB to the UE. This is one preferred embodiment of the present invention, and
2) As shown in FIG. 12, the sub-band in the fronthaul link is identical to the target sub-band. In other words, the sub-band transpose of frequency offset S2 by the UE is restored to the target sub-band by the sub-band repeater, thereby this configuration is gNB transparent from the physical channel perspective, i.e. the gNB does not need to apply frequency shift when it performs the physical resource mapping or de-mapping. This is the least likely embodiment, but just added here for completeness.

Data and control channels are user specific and can be made to support subband transpose.

PDSCH, PDCCH, PUSCH and PUCCH are user specific channels and can be placed anywhere in the full bandwidth of the carrier or bandwidth part by the gNB.

To support sub-band repetition for user specific physical channels:

The gNB can use a different physical resource mapping for the fronthaul link from the physical resource mapping of the access link for the user that communicates through the repeater, and The gNB knows where the scheduled repeater user's physical channels will be transposed to. It can adapt scheduling of other users who do not go through the repeater to use the revised physical resource map.

Note: The same straightforward approach should also work for reference signals (e.g., CSI-RS, SRS, etc.)

RACH, Broadcast, and Sync channels are cell specific and they can be made to support subband transpose.

SSB and RACH signals are cell specific channels which are not as straightforward as the data and control channels, since the frequency domain position of those channels carries information and needs to match the configurations that are broadcast.

Examples of relationships between the cell specific channels may include:

SSB signal has to start from certain frequency offset (SS un) which can be derived from Global Synchronization Channel Number (GSCN) according to 3GPP 38.104, The frequency offset of RACH signal is defined by S1B1 message and the PRB allocation of the SIB1 is determined by PDCCH with SI-RNTI (System Information RNTI), and The frequency offset of the PDCCH CORSET that carries SIB1 info (PDCCH CORESET #0) is defined in the SSB signal.

To support sub-band repetition, example embodiments of the invention suggest that different SSB and RACH signals be used between the access and the fronthaul link. Exemplary diagrams of such arrangement are illustrated in FIG. 13 and FIG. 14.

Figure 13:
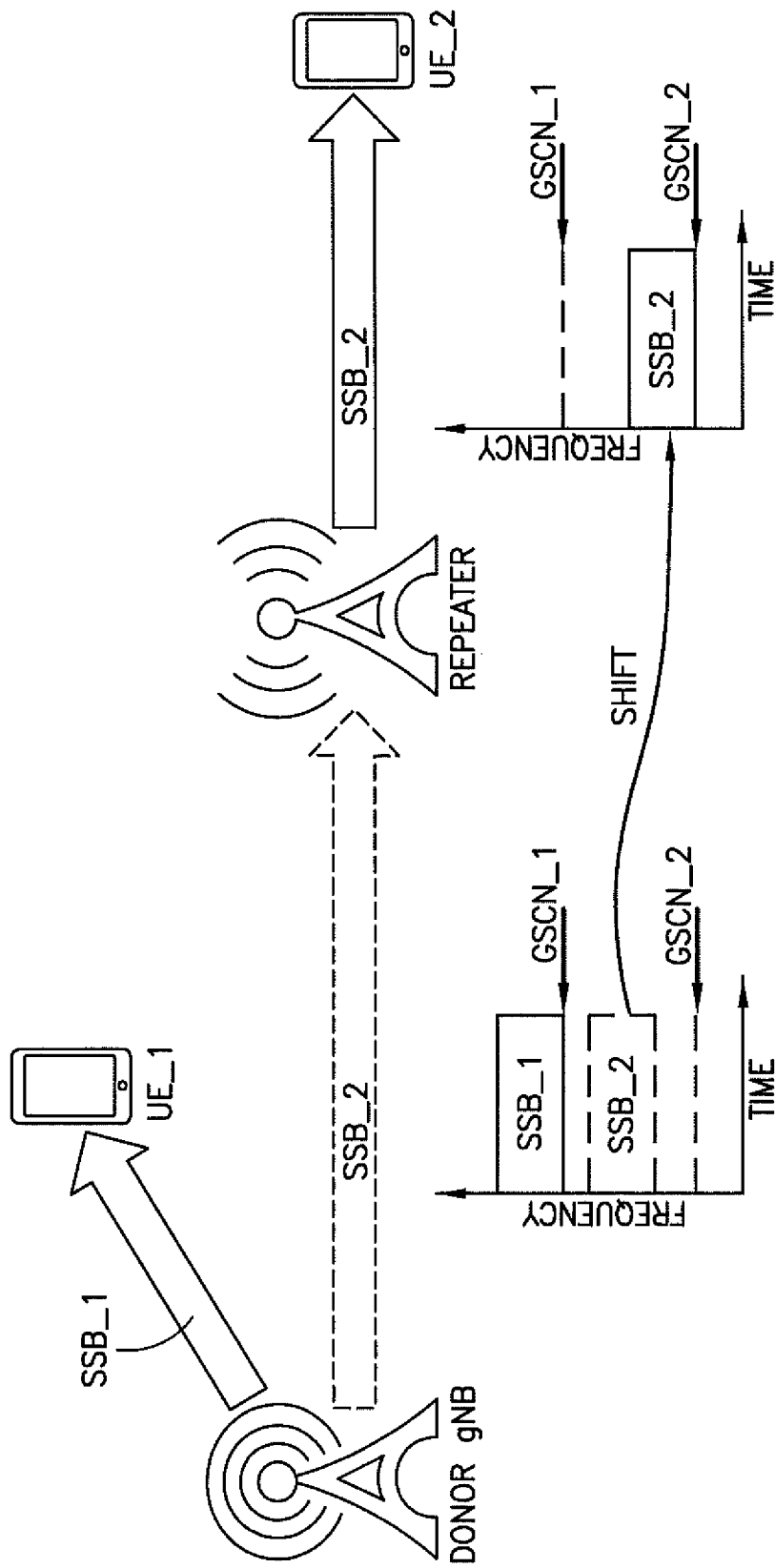
FIG. 13 shows a Sub-band Transpose for SSB signal.
Figure 14:
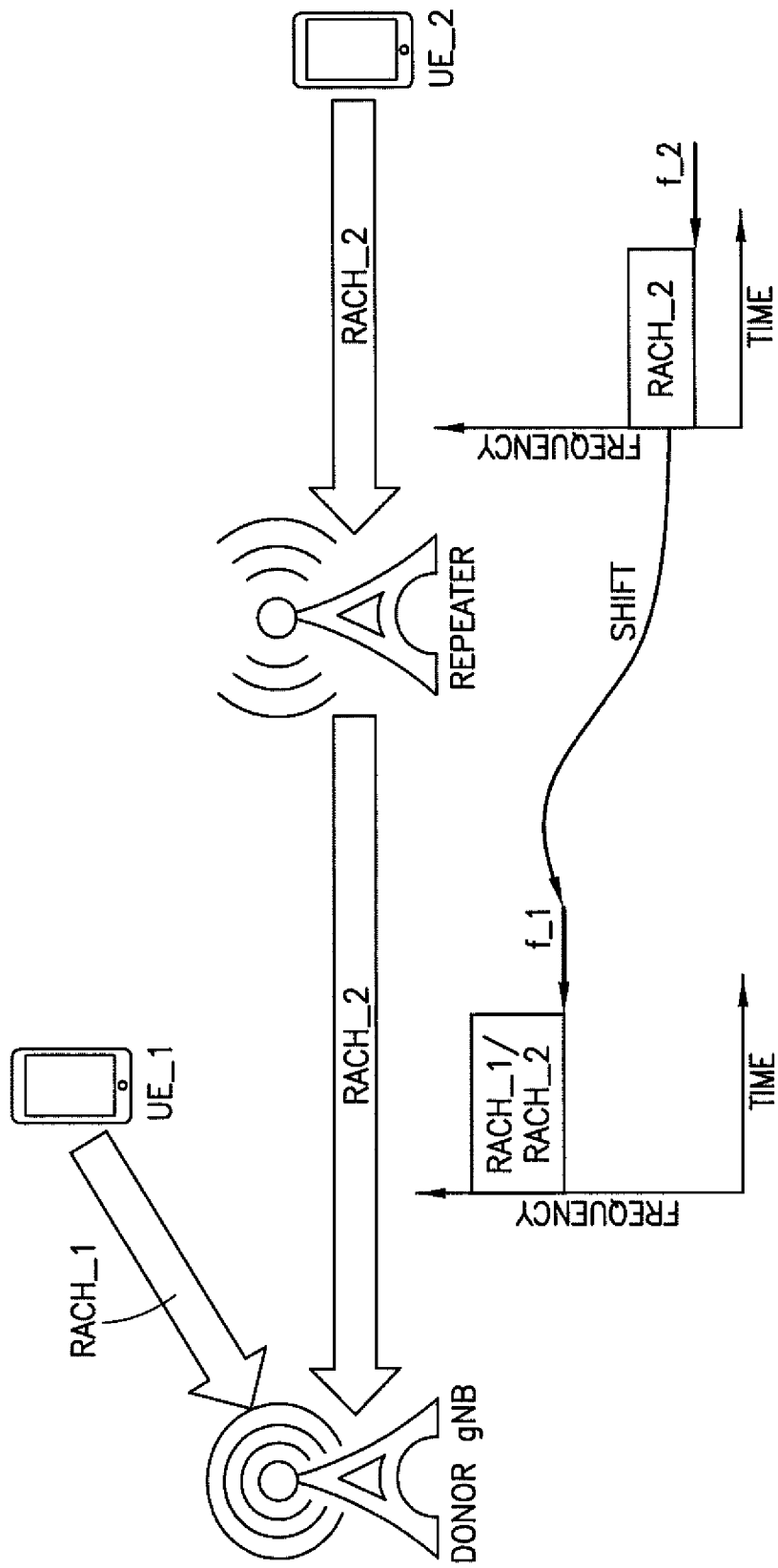
FIG. 14 shows a Sub-band Transpose for RACH signal.

The steps for sub-band transpose of Cell Specific signal comprise:

As is shown in FIG. 13, the gNB generates two copies of the SSB signal, namely SSB_1 and SSB_2, SSB_1 is physically mapped to GSCN raster GSCN_1; SSB_2 is not mapped to any GSCN raster within the ARFCN, UE_1 is in the Donor gNB coverage area and can find SSB_1 but not SSB_2 (as SSB_2 doesn't have a legal start frequency offset), The repeater receives both SSB_1 and illegally placed SSB_2. Through band pass filtering, the repeater will let in the illegally placed SSB_2 and suppress the SSB_1, The repeater will shift the SSB_2 to align with a new GSCN raster CSCN_2, which is still within the carrier ARFCN, The repeater will transmit the correctly placed SSB_2 and suppress any other signal outside the new legal SSB_2 signal, UE_2 is in the repeater coverage, and it only sees SSB_2, but not SSB_1, SSB_1 and SSB_2 can contain different CORESET #0 configurations, which makes it possible for UE_1 and UE_2 to receive different SIB1 content, which contains configuration of the frequency offset for the RACH channel, As is shown in FIG. 14, UE_1 sends the RACH signal RACH_1 over frequency offset f1 as instructed by the donor specific SIB1 content it receives. UE_2 sends the RACH signal RACH_2 over frequency offset f2 as instructed by repeater specific SIB! content it receives, The repeater will receive RACH_1 and shift it from f_2 to f1 before transmitting it out, and The gNB will see a combined RACH signal from local and remote (through the repeater) UEs at the intended donor specific SIB1 configuration.

The above procedure is UE transparent and there is no full overlap in frequency domain of the common (cell specific) channels in the fronthaul link and the access link.

The interworking between the gNB, the repeater and the UE to support sub-band repetition in SGNR networks can comprise:

1. The gNB determines the traffic payload to be transmitted at a specific time between the gNB and the UE, such payload may be determined by the data buffer status at the gNB side for the downlink or at the UE side for the uplink. The time to transmit may indicate the beginning of a certain slot or even a certain symbol,
2. The gNB determines the optimal frequency ranges for transmission in the fronthaul link and the access link based on the signal quality measurement. For example, on the access link, the UE can be configured by the gNB to report CQI or RSRP measurement on the downlink reference signals including SSB, DMRS and CSI-RS signal; on the fronthaul link, the gNB can measure SINR based on the uplink reference signals including DMRS and SRS signal,
3. The gNB determines the sub-band bandwidth required for the physical channels based on the payload information from step 1 and channel quality from step 2. The sub-band bandwidth may be represented in the number of PRBs, 4. The gNB determines the frequency offsets of the sub-bands in the favorable frequency ranges in the fronthaul link and the access link. The gNB may attempt to make the sub-band in the access link and sub-band in the fronthaul link as far apart as possible, preferably with no overlap in the frequency domain, 5. The gNB or the UE generates the physical channels using the target sub-band, i.e. the sub-band that matches with the content of the physical channels and can be received and decoded end to end by the gNB or the UE. The target sub-band may be identical to either the access sub-band or the fronthaul sub-band.

6. The gNB performs physical resource mapping to shift the target sub-band to the fronthaul sub-band before transmitting, 7. The gNB sends a REPEATER SUB-BAND REPETITION CONFIGURATION message to the repeater through the gNB-Repeater configuration channel. This message may include information on the sub-band for the incoming signal and the required frequency shift to obtain the sub-band for the outgoing signal. FIG. 19A shows an exemplary REPEATER SUB-BAND REPETITION CONFIGURATION message in accordance with example embodiments of the invention, Note that only Frequency shift factor or Spectral inversion (not both) may be required in certain embodiments, and 8. The gNB sends a UE SUB-BAND REPETITION CONFIGURA TIONmessage to the UE through the gNB-UE configuration channel if the sub-band in the access link is different from the target sub-band. This message may include the required frequency shift information in order for the UE to correctly map the sub-band in the access link with the target sub-band. An exemplary UE SUB-BAND REPETITION CONFIGURATION message may comprise details as shown in FIG. 19A.

FIG. 19B shows an exemplary UE-SUBBAND-REPETITION-CONFIGURATION message in accordance with example embodiments ofthe invention.

FIG. 19B shows a message between the network node and the user equipment in configuration of the subband frequency shifting.

Note the difference between operations of the Repeater and the UE is that the repeater needs to frequency shift both the access link and the fronthaul link. (i.e., the incoming and outgoing subband can be either access link or the fronthaul link). The UE just need to deal with access link and the target subband (the correct subcarrier location before frequency shift). Also the UE may not do the spectral inversion.

Figure 15:
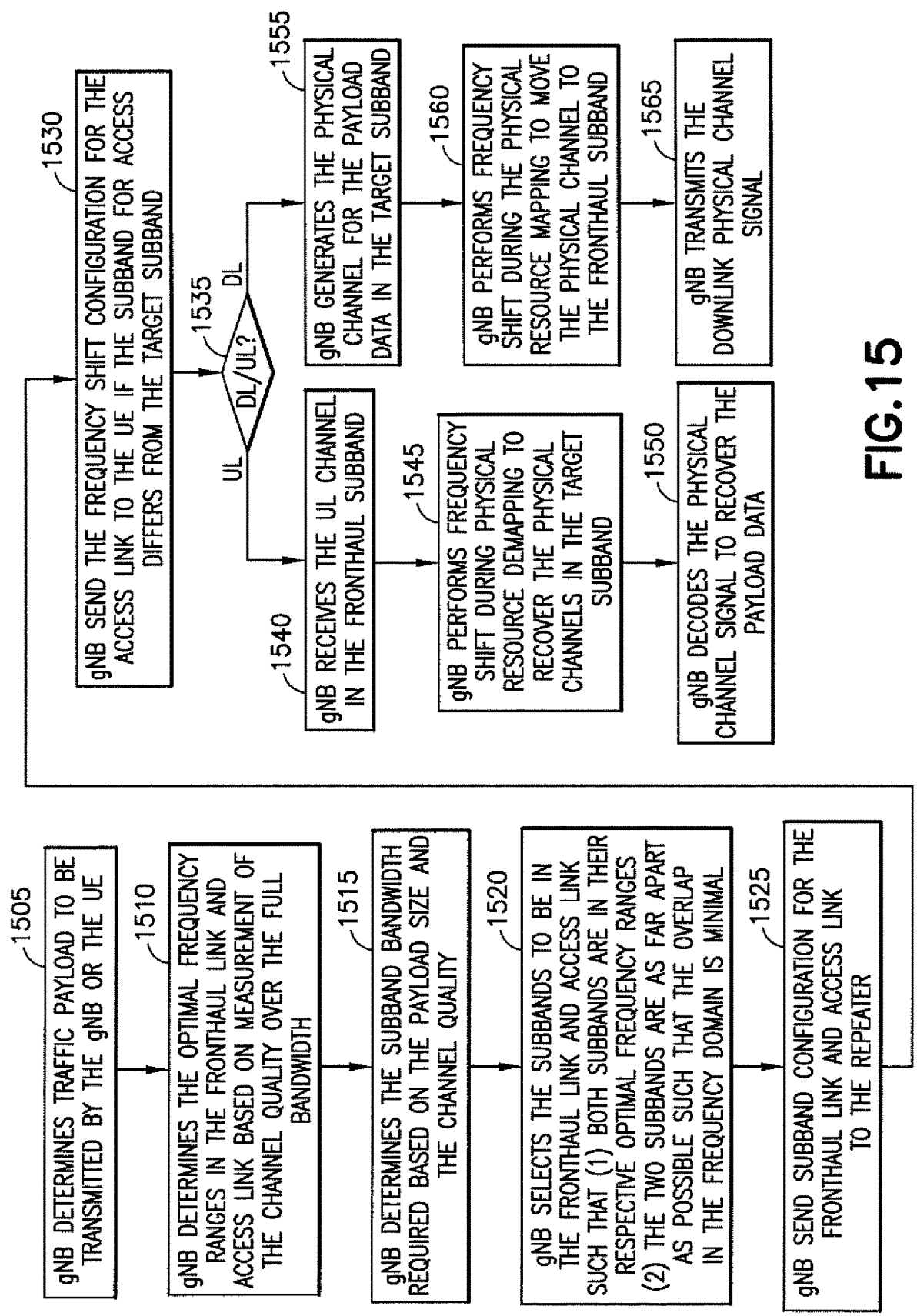
FIG. 15 shows Flow Chart of operations of a Donor gNB in accordance with example embodiments of the invention.

FIG. 15 shows Flow Chart of operations of a Donor gNB in accordance with example embodiments of the invention. As shown in step 1505 of FIG. 15 the gNB determines traffic payload to be transmitted by the gNB or UE. As shown in step 1510 of FIG. 15 the gNB determines optimal frequency ranges in the fronthaul link and access link based on a measurement of channel quality over a full bandwidth. As shown in step 1515 of FIG. 15 the gNB determines the subband bandwidth required based on the payload size and channel quality. As shown in step 1520 of FIG. 15 the gNB selects the subbands to be in the fronthaul link and access link such that (1) both subbands are in their respective optimal frequency ranges (2) the two subbands are as far apart as possible such that the overlap in the frequency domain is minimal. As shown in step 1525 of FIG. 15 the gNB sends subband configurations for the fronthaul link and the access link to the Repeater. As shown in step 1530 of FIG. 15 the gNB sends the frequency shift configuration for the access link to the UE if subband for access differs from the target subband. As shown in step 1535 of FIG. 15 it is determined whether the relevant payload data is of a downlink (DL) or uplink (UL). As shown in step 1540 of FIG. 15, for the case that it is UL data the gNB receives UL channel in the fronthaul subband. Then as shown in step 1545 of FIG. 15 the gNB performs frequency shift during physical resource de-mapping to recover physical channels in the target subband. As shown in step 1550 of FIG. 15 the gNB decodes the physical channel signal to recover the payload data. As shown in step 1555 of FIG. 15 for that it is DL data the gNB generates the physical channel for the payload data in the target subband. As shown in step 1560 of FIG. 15 the gNB performs frequency shift during the physical resource mapping to move the physical channel to the fronthaul subband. Then as shown in step 1565 of FIG. 15 the gNB transmits the downlink physical channel signal.

Figure 16:
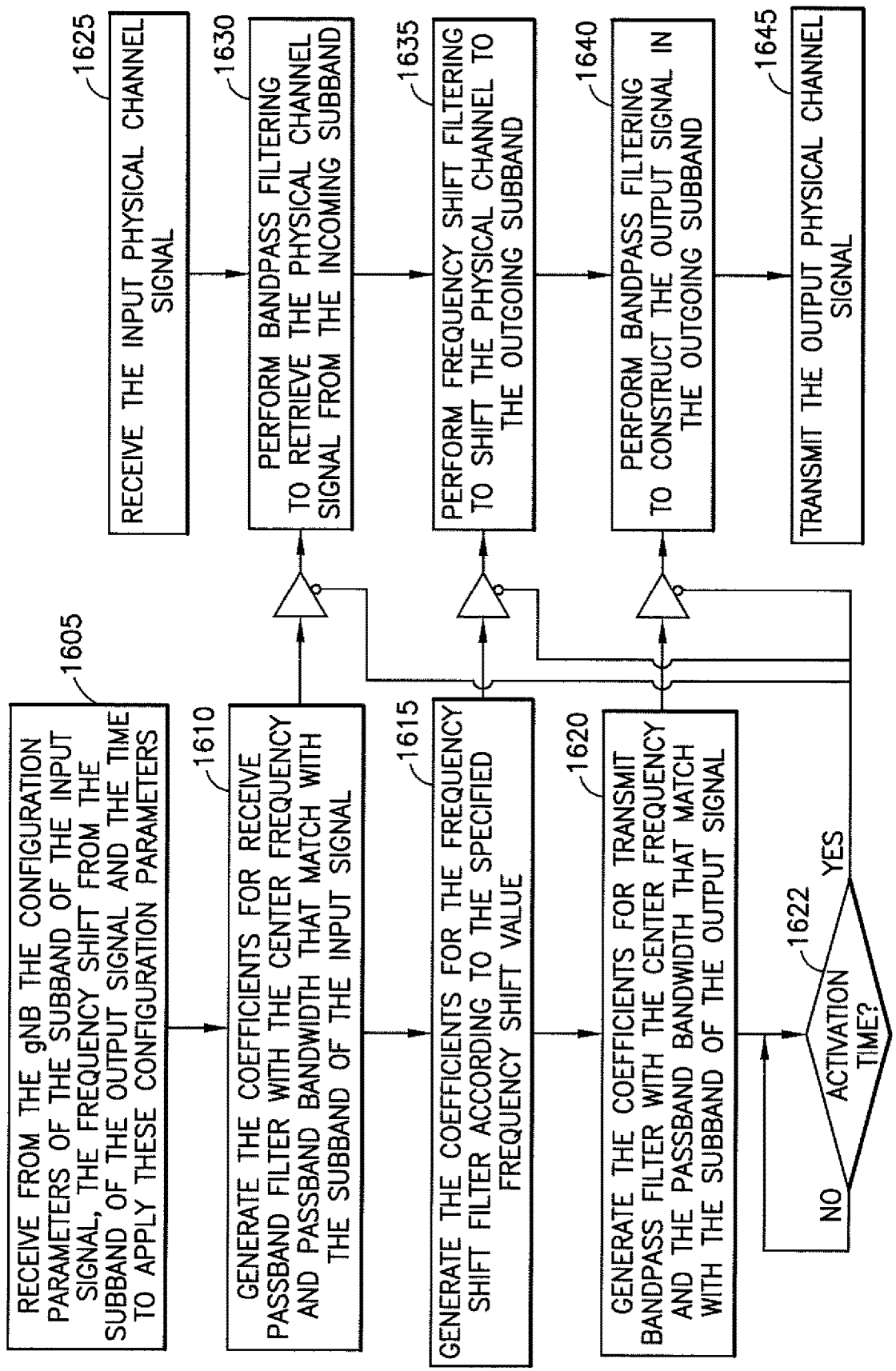
FIG. 16 shows Flow Chart of operations of the Sub-band Repeater in accordance with example embodiments of the invention.

FIG. 16 shows Flow Chart of operations of the Sub-band Repeater in accordance with example embodiments of the invention. As shown in step 1605 of FIG. 16 there is received from the gNB the configuration parameters of the subband of the input signal, frequency shift from the subband of the output signal and the time to apply these configuration parameters. As shown in step 1610 of FIG. 16 there is generating the coefficients for receive passband filter with the center frequency and passband bandwidth to match with the subband of the input signal. As shown in step 1615 of FIG. 16 there is generating the coefficients for the frequency shift filter according to specified frequency shift value. As shown in step 1620 of FIG. 16 there is generating coefficients for transmitting a bypass filter with the center frequency and the passband bandwidth that match with the subband of the output signal. As shown in step 1625 of FIG. 16 there is receiving the input physical channel signal. As shown in step 1622 of FIG. 16 there is determined an activation time. As shown in step 1630 of FIG. 16 there is performing bandpass filtering to retrieve the physical signal channel signal from the incoming subband. As shown in step 1635 of FIG. 16 there is performing frequency shift filtering to shift the physical channel to the outgoing subband. As shown in step 1640 of FIG. 16 there is performing bandpass filtering to construct the output signal in the outgoing subband. Then as shown in step 1645 of FIG. 16 there is transmitting the output physical channel signal.

Figure 17:
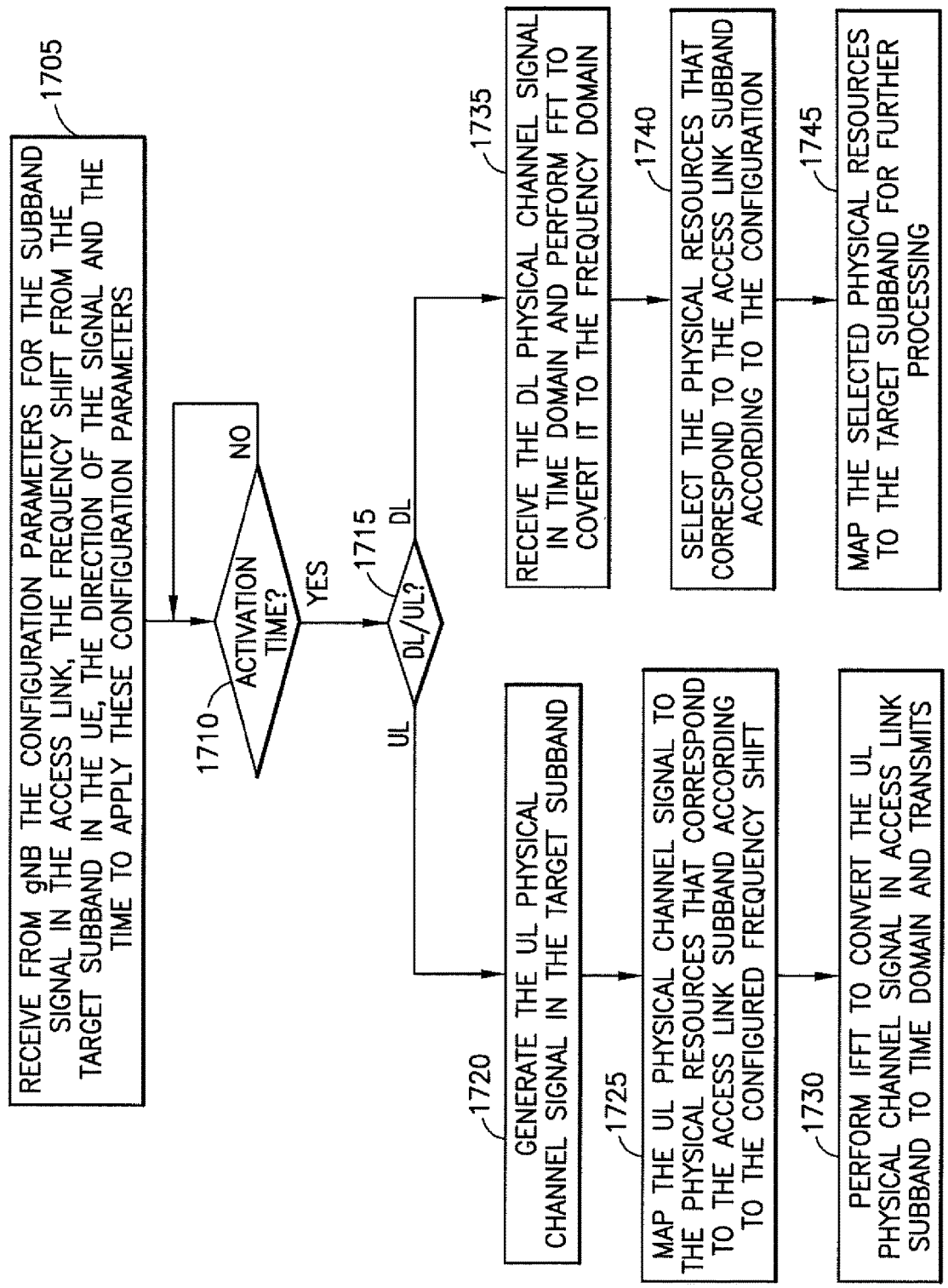
FIG. 17 shows flow chart operations of the UE in accordance with example embodiments of the invention.

FIG. 17 shows flow chart operations of the UE in accordance with example embodiments of the invention. As shown in step 1705 of FIG. 17 there is receiving from gNB the configuration parameters for the subband signal in the access link, the frequency shift from the target subband in the UE, the direction of the signal and the time to apply these configuration parameters. As shown in step 1710 of FIG. 17 there is determined whether there is an activation time. Then in step 1715 of FIG. 17 there is determined whether payload data is over a DL or a UL. As shown in step 1720 of FIG. 17 for the case it is UL data there is generating the UL physical channel signal in the target subband. As shown in step 1725 of FIG. 17 there is mapping UL physical channel signal to physical resources that correspond to the access link subband according to the configured frequency shift. Then as shown in step 1730 of FIG. 17 there is performing IFFT to convert UL physical channel signal in access link subband to time domain and transmit. As shown in step 1735 of FIG. 17 for a case it is DL data there is receiving the DL physical channel signal in time domain and perform FFT to convert it to physical domain. As shown in step 1740 of FIG. 17 there is selecting the physical resources that correspond to the access link subband according to the configuration. Then as shown in step 1745 of FIG. 17 there is mapping the selected physical resources to the target subband for further processing.

Figure 22:
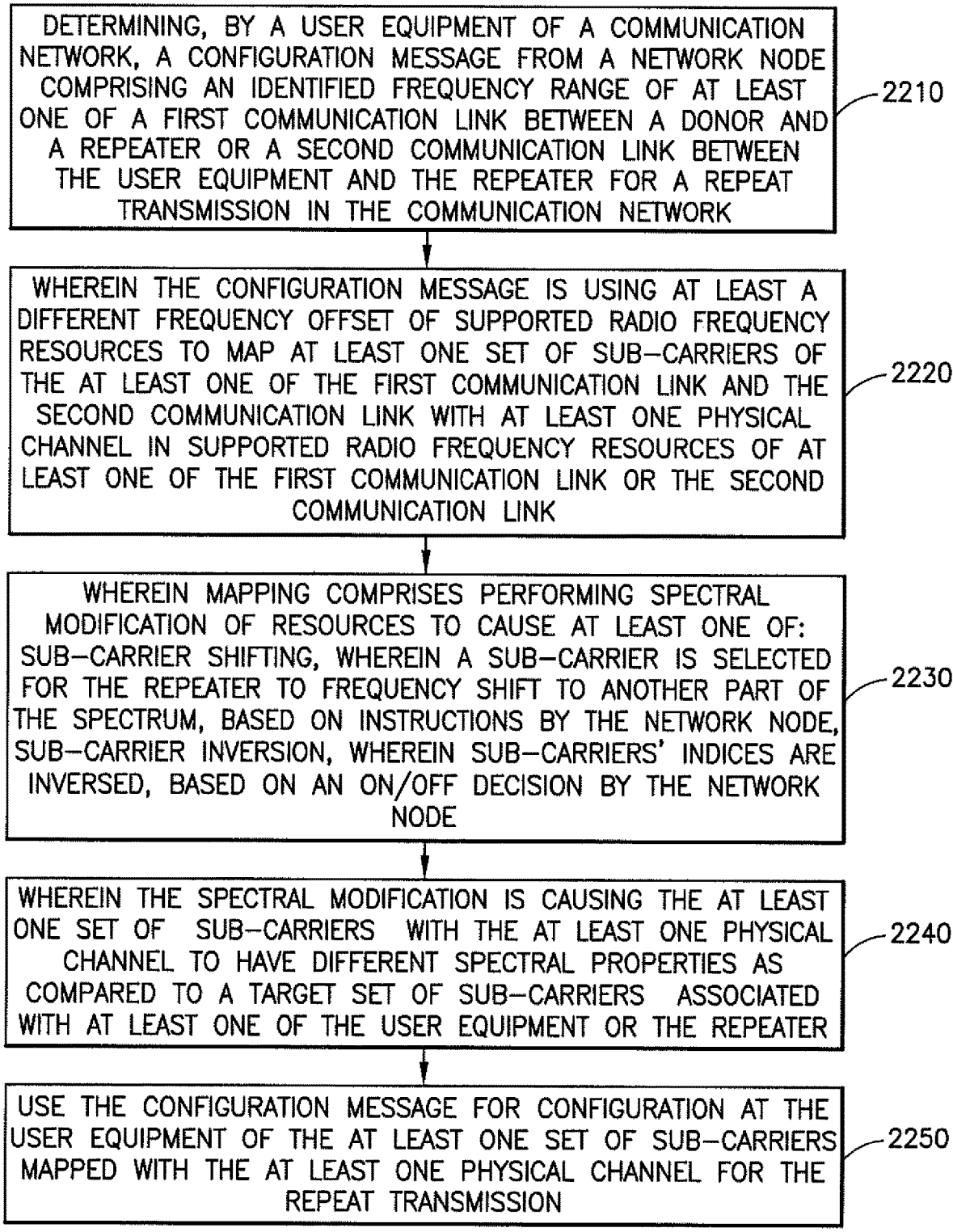

FIG. 20, FIG. 21, and FIG. 22 each show a method in accordance with example embodiments of the invention which may be performed by an apparatus, such as an apparatus of FIG. 18.

FIG. 20 illustrates operations which may be performed by a network device such as, but not limited to, a network node NN 12 and/or an NN 13 as in FIG. 18 or a gNB or an eNB. As shown in step 2010 there is determining, by a network node of a communication network, a configuration message comprising an identified frequency range of at least one of a first communication link between a donor and a repeater or a second communication link between a user equipment and the repeater for a repeat transmission in the communication network. As show in step 2020 wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link. As shown in step 2030 of FIG. 18 wherein mapping comprises performing spectral modification of resources to cause at least one of: sub-carrier shifting, wherein a sub-carrier is selected for the repeater to frequency shift to another part of the spectrum, based on instructions by the network node, sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one of the user equipment or the repeater. Then as shown in step 2040 of FIG. 18 there is sending towards at least one of the repeater or the user equipment an indication of the configuration message for configuration at the repeater and the user equipment of the at least one set of sub-carriers mapped with the at least one physical channel for the repeat transmission.

In accordance with the example embodiments as described in the paragraph above, wherein the first communication link comprises a fronthaul link, and the second communication link comprises an access link.

In accordance with the example embodiments as described in the paragraphs above, wherein a minimal frequency offset comprises one-subcarrier spacing.

In accordance with the example embodiments as described in the paragraphs above, wherein information concerning scheduling of physical channels of the user equipment is transmitted in one or more sets; and wherein scheduling information based on the spectral modification is placed in ignored time frequency resources for the user equipment being served by a network node; and wherein scheduling information for before the spectral modification of resources that is to be ignored is placed in time frequency resources for the user equipment being served by a repeater.

In accordance with the example embodiments as described in the paragraphs above, wherein the different frequency offset for a mirror image of signaling based on the at least one of sub-carrier mapping or shifting or sub-carrier mapping or inversion is identified based on a preferred frequency range based on quality of the at least one physical channel in the supported radio frequency resources of the at least one of the first communication link or the second communication link.

In accordance with the example embodiments as described in the paragraphs above, wherein a mirror image of signaling of the at least one set of sub-carriers of the at least one of the first communication link or the second communication link in the different frequency offset is using at least one sub-carrier that is one of partially or fully overlapping the target sub-carrier associated with at least one of the user equipment or the repeater.

In accordance with the example embodiments as described in the paragraphs above, wherein the at least one physical channel comprises at least one of a downlink physical channel or an uplink physical channel.

In accordance with the example embodiments as described in the paragraphs above, wherein the at least one set of sub-carriers comprises useful data for the repeat transmission that is from at least a portion of a full channel bandwidth from which the useful data is taken.

In accordance with the example embodiments as described in the paragraphs above, wherein the configuration message comprises at least one of a receive bandpass filter or a configurable transmit bandpass filter with a passband bandwidth and frequency offset that matches a signal bandwidth and a targeted frequency offset.

In accordance with the example embodiments as described in the paragraphs above, wherein at least one of the configurable transmit bandpass filter or configurable receive bandpass filter, are configured to ensure that only useful data in the target sub-carrier can go through the repeater, and anything outside of the useful data will be suppressed.

In accordance with the example embodiments as described in the paragraphs above, wherein shifting the at least one set of sub-carriers with the at least one physical channel to a different frequency offset is based on a maximum allowed separation between the at least one set of sub-carriers of the first communication link and the second communication link.

In accordance with the example embodiments as described in the paragraphs above, wherein shifting the at least one set of sub-carriers with the at least one physical channel to a different frequency offset is based on user traffic associated with the user equipment.

In accordance with the example embodiments as described in the paragraphs above, wherein based on the different frequency offset the indication of the configuration message is sent toward at least one of the user equipment or the repeater.

In accordance with the example embodiments as described in the paragraphs above, wherein determining the configuration message is based on at least one of: a traffic payload to be transmitted between the network node and the user equipment at a specific time beginning at one of a particular slot or symbol, a maximum allowed separation between the at least one set of sub-carriers of the first communication link and the second communication link, a number of physical resource blocks of a subband bandwidth required for the at least one physical channel based on a traffic payload to be transmitted between the network node and the user equipment, or a starting frequency offset of a set of sub-carriers in a preferred frequency ranges of the at least one of the fronthaul link or the access link.

In accordance with the example embodiments as described in the paragraphs above, wherein the indication of the configuration message sent towards at least one of the repeater or the user equipment is using a set of sub-carriers repetition configuration message.

In accordance with the example embodiments as described in the paragraphs above, wherein the set of sub-carriers repetition configuration message is sent based on the at least one sub-band being different between the fronthaul link and the access link.

A non-transitory computer-readable medium (MEM 12B and/or MEM 13B as in FIG. 18) storing program code (PROG 12C and/or PROG 13C as in FIG. 18), the program code executed by at least one processor (DP 12A and/or DP 13A as in FIG. 18) to perform the operations as at least described in the paragraphs above.

In accordance with an example embodiment of the invention as described above there is an apparatus comprising: means for determining (TRANS 12D and/or TRANS 13D, MEM 12B and/or MEM 13B, PROG 12C and/or PROG 13C, and DP 12A and/or DP 13A as in FIG. 18), by a network node (NNN 12 and/or NN 13 as in FIG. 18) of a communication network (Network 1 as in FIG. 18), a configuration message comprising an identified frequency range of at least one of a first communication link between a donor and a repeater (NN 10 as in FIG. 18) or a second communication link between a user equipment and the repeater for a repeat transmission in the communication network, wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and wherein mapping comprises means for performing spectral modification of resources to cause at least one of: sub-carrier shifting (TRANS 12D and/or TRANS 13D, MEM 12B and/or MEM 13B, PROG 12C and/or PROG 13C, and DP 12A and/or DP 13A as in FIG. 18), wherein a sub-carrier is selected for the repeater to frequency shift to another part of the spectrum, based on instructions by the network node, sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one of the user equipment or the repeater; and means for sending (TRANS 12D and/or TRANS 13D, MEM 12B and/or MEM 13B, PROG 12C and/or PROG 13C, and DP 12A and/or DP 13A as in FIG. 18) towards at least one of the repeater or the user equipment an indication of the configuration message for configuration at the repeater and the user equipment of the at least one set of sub-carriers mapped with the at least one physical channel for the repeat transmission.

In the example aspect of the invention according to the paragraph above, wherein at least the means for determining and sending comprises a non-transitory computer readable medium [MEM 12B and/or MEM 13B] encoded with a computer program [PROG 12C and/or PROG 13C] executable by at least one processor [DP 12A and/or DP 12C].

FIG. 21 illustrates operations which may be performed by a network device such as, but not limited to, a network node NN 10 as in FIG. 18 or a repeater. As shown in step 2110 of FIG. 21 there is determining, by a repeater of a communication network, an indication of a configuration message from a network node identifying a frequency range of at least one of a first communication link between a donor and a repeater or a second communication link between a user equipment and the repeater for a repeat transmission in the communication network. As shown in step 2120 of FIG. 21 wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link. As shown in step 2130 of FIG. 21 wherein mapping comprises performing spectral modification of resources to cause at least one of: sub-carrier shifting, wherein a sub-carrier is selected for the repeater to frequency shift to another part of the spectrum, based on instructions by the network node, sub-carrier inversion, wherein sub-carriers' indices are inversed, based on an on/off decision by the network node. As shown in step 2140 of FIG. 21 wherein the spectral modification is causing the at least one set of sub-carriers with the at least one physical channel to have different spectral properties as compared to a target set of sub-carriers associated with at least one of the user equipment or the repeater. Then as shown in step 2150 of FIG. 21 there is using by the repeater the indication of the configuration message for configuration at the repeater of the at least one set of sub-carriers mapped with the at least one physical channel for the repeat transmission.

In accordance with the example embodiments as described in the paragraph above, wherein the first communication link comprises a fronthaul link, and the second communication link comprises an access link.

In accordance with the example embodiments as described in the paragraphs above, wherein a minimal frequency offset comprises one-subcarrier spacing.

In accordance with the example embodiments as described in the paragraphs above, wherein the different frequency offset for a minor image of signaling based on the at least one of sub-carrier mapping or shifting or sub-carrier mapping or inversion is identified based on a preferred frequency range based on quality of the at least one physical channel in the supported radio frequency resources of the at least one of the first communication link or the second communication link.

In accordance with the example embodiments as described in the paragraphs above, wherein a mirror image of signaling of the at least one set of sub-carriers of the at least one of the first communication link or the second communication link in the different frequency offset is using at least one sub-carrier that is one of partially or fully overlapping the target sub-carrier associated with at least one of the user equipment or the repeater.

In accordance with the example embodiments as described in the paragraphs above, wherein the at least one physical channel comprises at least one of a downlink physical channel or an uplink physical channel.

In accordance with the example embodiments as described in the paragraphs above, wherein the at least one set of sub-carriers comprises useful data for the repeat transmission that is from at least a portion of a full channel bandwidth from which the useful data is taken.

In accordance with the example embodiments as described in the paragraphs above, wherein the configuration message comprises at least one of a receive bandpass filter or a configurable transmit bandpass filter with a passband bandwidth and frequency offset that matches a signal bandwidth and a targeted frequency offset.

In accordance with the example embodiments as described in the paragraphs above, wherein at least one of the configurable transmit bandpass filter or configurable receive bandpass filter, are configured to ensure that only useful data in the target sub-carrier can go through the repeater, and anything outside of the useful data will be suppressed.

In accordance with the example embodiments as described in the paragraphs above, wherein shifting the at least one set of sub-carriers with the at least one physical channel to a different frequency offset is based on a maximum allowed separation between the at least one set of sub-carriers of the first communication link and the second communication link.

In accordance with the example embodiments as described in the paragraphs above, wherein shifting the at least one set of sub-carriers with the at least one physical channel to a different frequency offset is based on user traffic associated with the user equipment.

In accordance with the example embodiments as described in the paragraphs above, wherein based on the different frequency offset the indication of the configuration message is sent toward at least one of the user equipment or the repeater.

In accordance with the example embodiments as described in the paragraphs above, wherein determining the configuration message is based on at least one of: a traffic payload to be transmitted between the network node and the user equipment at a specific time beginning at one of a particular slot or symbol, a maximum allowed separation between the at least one set of sub-carriers of the first communication link and the second communication link, a number of physical resource blocks of a subband bandwidth required for the at least one physical channel based on a traffic payload to be transmitted between the network node and the user equipment, or a starting frequency offset of a set of sub-carriers in a preferred frequency ranges of the at least one of the fronthaul link or the access link.

In accordance with the example embodiments as described in the paragraphs above, wherein the indication of the configuration message sent towards at least one of the repeater or the user equipment is using a set of sub-carriers repetition configuration message.

In accordance with the example embodiments as described in the paragraphs above, wherein the set of sub-carriers repetition configuration message is sent based on the at least one sub-band being different between the fronthaul link and the access link.

A non-transitory computer-readable medium (MEM 10B as in FIG. 18) storing program code (PROG 10C as in FIG. 18), the program code executed by at least one processor (DP 10A as in FIG. 18) to perform the operations as at least described in the paragraphs above.

In accordance with an example embodiment of the invention as described above there is an apparatus comprising: means for determining (TRANS 10D, MEM 10, PROG IOC, and DP 10A as in FIG. 18), by a repeater (NN 10 as in FIG. 18) of a communication network (Network 1 as in FIG. 18), an indication of a configuration message from a network node identifying a frequency range of at least one of a first communication link between a donor and a repeater or a second communication link between a user equipment and the repeater for a repeat transmission in the communication network, wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and wherein mapping comprises means for performing spectral modification (TRANS 10D, MEM 10, PROG 10C, and DP 10A as in FIG. 18) of resources to cause at least one of: sub-carrier shifting, wherein a sub-carrier is selected for the repeater to frequency shift to another part of the spectrum, based on instructions by the network node, sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one of the user equipment or the repeater; and means for using (TRANS 10D, MEM 10, PROG 10C, and DP 10A as in FIG. 18), by the repeater the indication of the configuration message for configuration at the repeater of the at least one set of sub-carriers mapped with the at least one physical channel for the repeat transmission.

In the example aspect of the invention according to the paragraph above, wherein at least the means for determining, performing, mapping, and using comprises a non-transitory computer readable medium [MEM 1013] encoded with a computer program [PROG 10C] executable by at least one processor [DP 10A].

FIG. 22 illustrates operations which may be performed by a network device such as, but not limited to, a network device UE 5 as in FIG. 18 or a user equipment. As shown in step 2210 of FIG. 22 there is determining, by a user equipment of a communication network, a configuration message from a network node comprising an identified frequency range of at least one of a first communication link between a donor and a repeater or a second communication link between a user equipment and the repeater for a repeat transmission in the communication network. As shown in step 2220 of FIG. 22 wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link. As shown in step 2230 of FIG. 22 wherein mapping comprises performing spectral modification of resources to cause at least one of: sub-carrier shifting, wherein a sub-carrier is selected for the repeater to frequency shift to another part of the spectrum, based on instructions by the network node, sub-carrier inversion, wherein sub-carriers' indices are inversed, based on an on/off decision by the network node. As shown in step 2240 of FIG. 22 wherein the spectral modification is causing the at least one set of sub-carriers with the at least one physical channel to have different spectral properties as compared to a target set of sub-carriers associated with at least one of the user equipment or the repeater. Then as shown in step 2250 of FIG. 22 there is using the configuration message for configuration at the user equipment of the at least one set of sub-carriers mapped with the at least one physical channel for the repeat transmission.

In accordance with the example embodiments as described in the paragraph above, wherein the first communication link comprises a fronthaul link, and the second communication link comprises an access link.

In accordance with the example embodiments as described in the paragraphs above, wherein a minimal frequency offset comprises one-subcarrier spacing.

In accordance with the example embodiments as described in the paragraphs above, wherein information concerning scheduling of physical channels of the user equipment is transmitted in one or more sets; and wherein scheduling information based on the spectral modification is placed in ignored time frequency resources for the user equipment being served by a network node; and wherein scheduling information for before the spectral modification of resources that is to be ignored is placed in time frequency resources for the user equipment being served by a repeater.

In accordance with the example embodiments as described in the paragraphs above, wherein the different frequency offset for a mirror image of signaling based on the at least one of sub-carrier mapping or shifting or sub-carrier mapping or inversion is identified based on a preferred frequency range based on quality of the at least one physical channel in the supported radio frequency resources of the at least one of the first communication link or the second communication link.

In accordance with the example embodiments as described in the paragraphs above, wherein a mirror image of signaling of the at least one set of sub-carriers of the at least one of the first communication link or the second communication link in the different frequency offset is using at least one sub-carrier that is one of partially or fully overlapping the target sub-carrier associated with at least one of the user equipment or the repeater.

In accordance with the example embodiments as described in the paragraphs above, wherein the at least one physical channel comprises at least one of a downlink physical channel or an uplink physical channel.

In accordance with the example embodiments as described in the paragraphs above, wherein the at least one set of sub-carriers comprises useful data for the repeat transmission that is from at least a portion of a full channel bandwidth from which the useful data is taken.

In accordance with the example embodiments as described in the paragraphs above, wherein the configuration message comprises at least one of a receive bandpass filter or a configurable transmit bandpass filter with a passband bandwidth and frequency offset that matches a signal bandwidth and a targeted frequency offset.

In accordance with the example embodiments as described in the paragraphs above, wherein at least one of the configurable transmit bandpass filter or configurable receive bandpass filter, are configured to ensure that only useful data in the target sub-carrier can go through the repeater, and anything outside of the useful data will be suppressed.

In accordance with the example embodiments as described in the paragraphs above, wherein shifting the at least one set of sub-carriers with the at least one physical channel to a different frequency offset is based on a maximum allowed separation between the at least one set of sub-carriers of the first communication link and the second communication link.

In accordance with the example embodiments as described in the paragraphs above, wherein shifting the at least one set of sub-carriers with the at least one physical channel to a different frequency offset is based on user traffic associated with the user equipment.

In accordance with the example embodiments as described in the paragraphs above, wherein based on the different frequency offset the indication of the configuration message is sent toward at least one of the user equipment or the repeater.

In accordance with the example embodiments as described in the paragraphs above, wherein determining the configuration message is based on at least one of: a traffic payload to be transmitted between the network node and the user equipment at a specific time beginning at one of a particular slot or symbol, a maximum allowed separation between the at least one set of sub-carriers of the first communication link and the second communication link, a number of physical resource blocks of a subband bandwidth required for the at least one physical channel based on a traffic payload to be transmitted between the network node and the user equipment, or a starting frequency offset of a set of sub-carriers in a preferred frequency ranges of the at least one of the fronthaul link or the access link.

In accordance with the example embodiments as described in the paragraphs above, wherein the indication of the configuration message sent towards at least one of the repeater or the user equipment is using a set of sub-carriers repetition configuration message.

In accordance with the example embodiments as described in the paragraphs above, wherein the set of sub-carriers repetition configuration message is sent based on the at least one sub-band being different between the fronthaul link and the access link.

A non-transitory computer-readable medium (MEM 5B as in FIG. 18) storing program code (PROG 5C as in FIG. 18), the program code executed by at least one processor (DP 5A as in FIG. 18) to perform the operations as at least described in the paragraphs above.

In accordance with an example embodiment of the invention as described above there is an apparatus comprising: means for determining (TRANS 5D, MEM 5B, PROG 5C, and DP 5A as in FIG. 18), by a user equipment (LTE 5 as in FIG. 18) of a communication network (Network 1 as in FIG. 18), a configuration message from a network node (NN 12 and/or NN 13 as in FIG. 18) comprising an identified frequency range of at least one of a first communication link between a donor and a repeater or a second communication link between a user equipment and the repeater for a repeat transmission in the communication network, wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and wherein mapping comprises means for performing spectral modification (TRANS 5D, MEM 5B, PROG 5C, and DP 5A as in FIG. 18) of resources to cause at least one of: sub-carrier shifting, wherein a sub-carrier is selected for the repeater to frequency shift to another part of the spectrum, based on instructions by the network node, sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one of the user equipment or the repeater; and means for using (TRANS 5D, MEM 5B, PROG 5C, and DP 5A as in FIG. 18) the configuration message for configuration at the user equipment of the at least one set of sub-carriers mapped with the at least one physical channel for the repeat transmission.

In the example aspect of the invention according to the paragraph above, wherein at least the means for determining, performing, and using comprises a non-transitory computer readable medium [MEM 5B] encoded with a computer program [PROG 5C] executable by at least one processor [DP 5A].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:
(a) hardware-only circuit implementations (such as implementations in only analog and/or digital circuitry);
(b) combinations of hardware circuits and software, such as (as applicable):
(i) a combination of analog and/or digital hardware circuit(s) with software/firmware; and
(ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
(c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:
(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" as may be used herein is to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor; and
   at least one non-transitory memory including computer program code, where the at least one non-transitory memory and the computer program code are configured, with the at least one processor, to cause the apparatus to at least:
   determine, by a network node of a communication network, a configuration message comprising an identified frequency range of at least one of a first communication link between a donor and a repeater or a second communication link between a user equipment and the repeater for a repeat transmission in the communication network,
   wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and
   wherein mapping comprises performing spectral modification of resources to cause at least one of:
   sub-carrier shifting, wherein a sub-carrier is selected for the repeater to frequency shift to another part of the spectrum, based on instructions by the network node,
   sub-carrier inversion, wherein sub-carriers' indices are inversed, based on an on/off decision by the network node,
   wherein the spectral modification is causing the at least one set of sub-carriers with the at least one physical channel to have different spectral properties as compared to a target set of sub-carriers associated with at least one of the user equipment or the repeater; and
   send towards at least one of the repeater or the user equipment an indication of the configuration message for configuration at the repeater and the user equipment of the at least one set of sub-carriers mapped with the at least one physical channel for the repeat transmission.

2. The apparatus of claim 1, wherein the first communication link comprises a fronthaul link, and the second communication link comprises an access link.

3. The apparatus of claim 1, wherein a minimal frequency offset comprises one-subcarrier spacing.

4. The apparatus of claim 1, wherein information concerning scheduling of physical channels of the user equipment is transmitted in one or more sets; and
   wherein scheduling information based on the spectral modification is placed in ignored time frequency resources for the user equipment being served by the network node; and
   wherein scheduling information for before the spectral modification of resources that is to be ignored is placed in time frequency resources for the user equipment being served by a repeater.

5. The apparatus of claim 4, wherein the at least one set of sub-carriers comprises useful data for the repeat transmission that is from at least a portion of a full channel bandwidth from which the useful data is taken.

6. The apparatus of claim 1, wherein the different frequency offset for a mirror image of signaling based on the at least one of sub-carrier mapping or shifting or sub-carrier mapping or inversion is identified based on a preferred frequency range based on quality of the at least one physical channel in the supported radio frequency resources of the at least one of the first communication link or the second communication link.

7. The apparatus of claim 1, wherein a mirror image of signaling of the at least one set of sub-carriers of the at least one of the first communication link or the second communication link in the different frequency offset is using at least one sub-carrier that is one of partially or fully overlapping the target sub-carrier associated with at least one of the user equipment or the repeater.

8. The apparatus of claim 1, wherein the at least one physical channel comprises at least one of a downlink physical channel or an uplink physical channel.

9. The apparatus of claim 1, wherein the configuration message comprises at least one of a receive bandpass filter or a configurable transmit bandpass filter with a passband bandwidth and frequency offset that matches a signal bandwidth and a targeted frequency offset.

10. The apparatus of claim 9, wherein at least one of the configurable transmit bandpass filter or configurable receive bandpass filter, are configured to ensure that only useful data in the target sub-carrier can go through the repeater, and anything outside of the useful data will be suppressed.

11. The apparatus of claim 1, wherein shifting the at least one set of sub-carriers with the at least one physical channel to a different frequency offset is based on a maximum allowed separation between the at least one set of sub-carriers of the first communication link and the second communication link.

12. The apparatus of claim 1, wherein shifting the at least one set of sub-carriers with the at least one physical channel to a different frequency offset is based on user traffic associated with the user equipment.

13. The apparatus of claim 12, wherein based on the different frequency offset the indication of the configuration message is sent toward at least one of the user equipment or the repeater.

14. The apparatus of claim 1, wherein determining the configuration message is based on at least one of:
   a traffic payload to be transmitted between the network node and the user equipment at a specific time beginning at one of a particular slot or symbol,
   a maximum allowed separation between the at least one set of sub-carriers of the first communication link and the second communication link, a number of physical resource blocks of a subband bandwidth required for the at least one physical channel based on a traffic payload to be transmitted between the network node and the user equipment, or
   a starting frequency offset of a set of sub-carriers in a preferred frequency ranges of the at least one of the fronthaul link or the access link.

15. The apparatus of claim 1, wherein the indication of the configuration message sent towards at least one of the repeater or the user equipment is using a set of sub-carriers repetition configuration message.

16. The apparatus of claim 15, wherein the set of sub-carriers repetition configuration message is sent based on the at least one sub-band being different between the fronthaul link and the access link.

17. A method, comprising:
   determining, by a network node of a communication network, a configuration message comprising an identified frequency range of at least one of a first communication link between a donor and a repeater or a second communication link between a user equipment and the repeater for a repeat transmission in the communication network, wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and wherein mapping comprises performing spectral modification of resources to cause at least one of:

sub-carrier shifting, wherein a sub-carrier is selected for the repeater to frequency shift to another part of the spectrum, based on instructions by the network node, sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one of the user equipment or the repeater; and sending towards at least one of the repeater or the user equipment an indication of the configuration message for configuration at the repeater and the user equipment of the at least one set of sub-carriers mapped with the at least one physical channel for the repeat transmission.

18. An apparatus comprising:

at least one processor; and at least one non-transitory memory including computer program code, where the at least one non-transitory memory and the computer program code are configured, with the at least one processor, to cause the apparatus to at least:

determine, by a repeater of a communication network, an indication of a configuration message from a network node identifying a frequency range of at least one of a first communication link between a donor and the repeater or a second communication link between a user equipment and the repeater for a repeat transmission in the communication network, wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and wherein mapping comprises performing spectral modification of resources to cause at least one of:

sub-carrier shifting, wherein a sub-carrier is selected for the repeater to frequency shift to another part of the spectrum, based on instructions by the network node, sub-carrier inversion, wherein sub-carriers' indices are inversed, based on an on/off decision by the network node, wherein the spectral modification is causing the at least one set of sub-carriers with the at least one physical channel to have different spectral properties as compared to a target set of sub-carriers associated with at least one of the user equipment or the repeater; and use by the repeater the indication of the configuration message for configuration at the repeater of the at least one set of sub-carriers mapped with the at least one physical channel for the repeat transmission.

19. The apparatus of claim 18, wherein the first communication link comprises a fronthaul link, arid the second communication link comprises an access link.

20. The apparatus of claim 18, wherein a minimal frequency offset comprises one-subcarrier spacing.

21. The apparatus of claim 18, wherein the different frequency offset for a mirror image of signaling based on the at least one of sub-carrier mapping or shifting or sub-carrier mapping or inversion is identified based on a preferred frequency range based on quality of the at least one physical channel in the supported radio frequency resources of the at least one of the first communication link or the second communication link.

22. The apparatus of claim 18, wherein a mirror image of signaling of the at least one set of sub-carriers of the at least one of the first communication link or the second communication link in the different frequency offset is using at least one sub-carrier that is one of partially or fully overlapping the target sub-carrier associated with at least one of the user equipment or the repeater.

23. The apparatus of claim 22, wherein the at least one set of sub-carriers comprises useful data for the repeat transmission that is from at least a portion of a full channel bandwidth from which the useful data is taken.

24. The apparatus of claim 18, wherein the at least one physical channel comprises at least one of a downlink physical channel or an uplink physical channel.

25. The apparatus of claim 18, wherein the configuration message comprises at least one of a receive bandpass filter or a configurable transmit bandpass filter with a passband bandwidth and frequency offset that matches a signal bandwidth and a targeted frequency offset.

26. The apparatus of claim 25, wherein at least one of the configurable transmit bandpass filter or configurable receive bandpass filter, are configured to ensure that only useful data in the target sub-carrier can go through the repeater, and anything outside of the useful data will be suppressed.

27. The apparatus of claim 18, wherein shifting the at least one set of sub-carriers with the at least one physical channel to a different frequency offset is based on a maximum allowed separation between the at least one set of sub-carriers of the first communication link and the second communication link.

28. The apparatus of claim 27, wherein based on the different frequency offset the indication of the configuration message is sent toward at least one of the user equipment or the repeater.

29. The apparatus of claim 18, wherein shifting the at least one set of sub-carriers with the at least one physical channel to a different frequency offset is based on user traffic associated with the user equipment.

30. The apparatus of claim 18, wherein determining the configuration message is based on at least one of:

a traffic payload to be transmitted between the network node and the user equipment at a specific time beginning at one of a particular slot or symbol, a maximum allowed separation between the at least one set of sub-carriers of the first communication link and the second communication link, a number of physical resource blocks of a subband bandwidth required for the at least one physical channel based on a traffic payload to be transmitted between the network node and the user equipment, or a starting frequency offset of a set of sub-carriers in a preferred frequency ranges of the at least one of the fronthaul link or the access link.

31. The apparatus of claim 18, wherein the indication of the configuration message sent towards at least one of the repeater or the user equipment is using a set of sub-carriers repetition configuration message.

32. The apparatus of claim 31, wherein the set of sub-carriers repetition configuration message is sent based on the at least one sub-band being different between the fronthaul link and the access link.

33. A method, comprising:
determining, by a repeater of a communication network, an indication of a configuration message from a network node identifying a frequency range of at least one of a first communication link between a donor and the repeater or a second communication link between a user equipment and the repeater for a repeat transmission in the communication network,
wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and
wherein mapping comprises performing spectral modification of resources to cause at least one of:
sub-carrier shifting, wherein a sub-carrier is selected for the repeater to frequency shift to another part of the spectrum, based on instructions by the network node,
sub-carrier inversion, wherein sub-carriers' indices are inversed, based on an on/off decision by the network node,
wherein the spectral modification is causing the at least one set of sub-carriers with the at least one physical channel to have different spectral properties as compared to a target set of sub-carriers associated with at least one of the user equipment or the repeater; and
using by the repeater the indication of the configuration message for configuration at the repeater of the at least one set of sub-carriers mapped with the at least one physical channel for the repeat transmission.

34. An apparatus comprising:
at least one processor; and
at least one non-transitory memory including computer program code, where the at least one non-transitory memory and the computer program code are configured, with the at least one processor, to cause the apparatus to at least:
determine, by a user equipment of a communication network, a configuration message from a network node comprising an identified frequency range of at least one of a first communication link between a donor and a repeater or a second communication link between the user equipment and the repeater for a repeat transmission in the communication network,
wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and
wherein mapping comprises performing spectral modification of resources to cause at least one of:
sub-carrier shifting, wherein a sub-carrier is selected for the repeater to frequency shift to another part of the spectrum, based on instructions by the network node,
sub-carrier inversion, wherein sub-carriers' indices are inversed, based on an on/off decision by the network node,
wherein the spectral modification is causing the at least one set of sub-carriers with the at least one physical channel to have different spectral properties as compared to a target set of sub-carriers associated with at least one of the user equipment or the repeater; and
use the configuration message for configuration at the user equipment of the at least one set of sub-carriers mapped with the at least one physical channel for the repeat transmission.

35. The apparatus of claim 34, wherein the first communication link comprises a fronthaul link, and the second communication link comprises an access link.

36. The apparatus of claim 34, wherein a minimal frequency offset comprises one-subcarrier spacing.

37. The apparatus of claim 34, wherein information concerning scheduling of physical channels of the user equipment is transmitted in one or more sets; and
wherein scheduling information based on the spectral modification is placed in ignored time frequency resources for the user equipment being served by a network node; and
wherein scheduling information for before the spectral modification of resources that is to be ignored is placed in time frequency resources for the user equipment being served by a repeater.

38. The apparatus of claim 34, wherein the different frequency offset for a mirror image of signaling based on the at least one of sub-carrier mapping or shifting or sub-carrier mapping or inversion is identified based on a preferred frequency range based on quality of the at least one physical channel in the supported radio frequency resources of the at least one of the first communication link or the second communication link.

39. The apparatus of claim 34, wherein a mirror image of signaling of the at least one set of sub-carriers of the at least one of the first communication link or the second communication link in the different frequency offset is using at least one sub-carrier that is one of partially or fully overlapping the target sub-carrier associated with at least one of the user equipment or the repeater.

40. The apparatus of claim 39, wherein the at least one set of sub-carriers comprises useful data for the repeat transmission that is from at least a portion of a full channel bandwidth from which the useful data is taken.

41. The apparatus of claim 34, wherein the at least one physical channel comprises at least one of a downlink physical channel or an uplink physical channel.

42. The apparatus of claim 34, wherein the configuration message comprises at least one of a receive bandpass filter or a configurable transmit bandpass filter with a passband bandwidth and frequency offset that matches a signal bandwidth and a targeted frequency offset.

43. The apparatus of claim 42, wherein at least one of the configurable transmit bandpass filter or configurable receive bandpass filter, are configured to ensure that only useful data in the target sub-carrier can go through the repeater, and anything outside of the useful data will be suppressed.

44. The apparatus of claim 34, wherein shifting the at least one set of sub-carriers with the at least one physical channel to a different frequency offset is based on a maximum allowed separation between the at least one set of sub-carriers of the first communication link and the second communication link.

45. The apparatus of claim 34, wherein shifting the at least one set of sub-carriers with the at least one physical channel to a different frequency offset is based on user traffic associated with the user equipment.

46. The apparatus of claim 45, wherein based on the different frequency offset the indication of the configuration message is sent toward at least one of the user equipment or the repeater.

47. The apparatus of claim 34, wherein determining the configuration message is based on at least one of:
   a traffic payload to be transmitted between the network node and the user equipment at a specific time beginning at one of a particular slot or symbol,
   a maximum allowed separation between the at least one set of sub-carriers of the first communication link and the second communication link, a number of physical resource blocks of a subband bandwidth required for the at least one physical channel based on a traffic payload to be transmitted between the network node and the user equipment, or
   a starting frequency offset of a set of sub-carriers in a preferred frequency ranges of the at least one of the fronthaul link or the access link.

48. The apparatus of claim 34, wherein the indication of the configuration message sent towards at least one of the repeater or the user equipment is using a set of sub-carriers repetition configuration message.

49. The apparatus of claim 48, wherein the set of sub-carriers repetition configuration message is sent based on the at least one sub-band being different between the fronthaul link and the access link.

50. A method, comprising:
   determining, by a user equipment of a communication network, a configuration message from a network node comprising an identified frequency range of at least one of a first communication link between a donor and a repeater or a second communication link between a user equipment and the repeater for a repeat transmission in the communication network,
   wherein the configuration message is using at least a different frequency offset of supported radio frequency resources to map at least one set of sub-carriers of the at least one of the first communication link and the second communication link with at least one physical channel in supported radio frequency resources of at least one of the first communication link or the second communication link, and
   wherein mapping comprises performing spectral modification of resources to cause at least one of;
   sub-carrier shifting, wherein a sub-carrier is selected for the repeater to frequency shift to another part of the spectrum, based on instructions by the network node,
   sub-carrier inversion, wherein sub-carriers' indices are inversed, based on an on/off decision by the network node,
   wherein the spectral modification is causing the at least one set of sub-carriers with the at least one physical channel to have different spectral properties as compared to a target set of sub-carriers associated with at least one of the user equipment or the repeater; and
   using the configuration message for configuration at the user equipment of the at least one set of sub-carriers mapped with the at least one physical channel for the repeat transmission.

* * * * *